(12) United States Patent
Mikula

(10) Patent No.: US 9,242,776 B2
(45) Date of Patent: Jan. 26, 2016

(54) GLUE APPLICATION METHOD FOR COLD SEAL COHESIVE PACKAGING

(71) Applicant: Shane Mikula, Naperville, IL (US)

(72) Inventor: Shane Mikula, Naperville, IL (US)

(*) Notice: Subject to any disclaimer, the term of this patent is extended or adjusted under 35 U.S.C. 154(b) by 205 days.

(21) Appl. No.: 13/692,728

(22) Filed: Dec. 3, 2012

(65) Prior Publication Data

US 2013/0276966 A1 Oct. 24, 2013

Related U.S. Application Data

(60) Provisional application No. 61/636,210, filed on Apr. 20, 2012, provisional application No. 61/636,226, filed on Apr. 20, 2012, provisional application No. 61/636,233, filed on Apr. 20, 2012.

(51) Int. Cl.

| | |
|---|---|
| *B05D 5/10* | (2006.01) |
| *B65D 73/00* | (2006.01) |
| *B32B 38/00* | (2006.01) |
| *C09J 107/02* | (2006.01) |
| *C09J 121/02* | (2006.01) |
| *B65D 75/36* | (2006.01) |
| *C09J 5/04* | (2006.01) |

(52) U.S. Cl.
CPC ............ *B65D 73/00* (2013.01); *B32B 38/0012* (2013.01); *B65D 75/366* (2013.01); *C09J 5/04* (2013.01); *C09J 107/02* (2013.01); *C09J 121/02* (2013.01); *Y10T 156/1051* (2015.01)

(58) Field of Classification Search
CPC ..... B65D 75/366; B65D 73/00; C09J 121/02; C09J 107/02; C09J 5/04
USPC ....................................... 427/207.1; 156/227
See application file for complete search history.

(56) References Cited

U.S. PATENT DOCUMENTS

| | | | |
|---|---|---|---|
| 2,637,251 A | 5/1953 | Spiess | |
| 3,224,159 A | 12/1965 | Pitt et al. | |
| 3,924,747 A | 12/1975 | Gerner | |
| 4,430,843 A | 2/1984 | Favale | |
| 5,014,851 A | 5/1991 | Wick | |
| 5,145,929 A * | 9/1992 | Ou-Yang | ........................ 526/338 |
| 5,704,481 A | 1/1998 | Lutz | |
| 6,085,904 A | 7/2000 | Perdue, Jr. | |
| 6,126,584 A | 10/2000 | Zadravetz | |
| 6,308,832 B1 | 10/2001 | Pirro et al. | |
| 6,719,139 B1 | 4/2004 | Foos et al. | |

(Continued)

FOREIGN PATENT DOCUMENTS

| | | |
|---|---|---|
| GB | 1142773 | 2/1969 |
| WO | WO97/05038 | 2/1997 |

*Primary Examiner* — Xiao Zhao
(74) *Attorney, Agent, or Firm* — Ice Miller LLP

(57) ABSTRACT

According to one aspect of the present disclosure, a method of applying a cold seal cohesive for product packaging is disclosed, the method including the steps of delivering a cold seal adhesive to a chambered doctor blade disposed adjacent a rotating transfer roller; transferring a quantity of adhesive to a transfer surface; rotating the transfer roller to contact a printing die mounted to a rotating die roller such that at least a first portion of the quantity of adhesive is transferred to the printing die; feeding a housing between the die roller and an adjacent rotating impression roller; rotating the die roller such that the printing die contacts the housing and transfers a portion of the quantity of adhesive from the printing die to the housing; and drying the adhesive on the housing, where the adhesive is a latex-based, dry-tack adhesive, with a viscosity of no more than 450 centipoize.

7 Claims, 22 Drawing Sheets

(56) References Cited

U.S. PATENT DOCUMENTS

| | | |
|---|---|---|
| 6,736,267 B2 | 5/2004 | Schamante |
| 7,207,441 B2 | 4/2007 | Ritter |
| 7,681,733 B2 | 3/2010 | Grosskopf |
| 7,695,809 B1 * | 4/2010 | Maksymkiw et al. ........ 428/343 |
| 7,726,480 B2 | 6/2010 | Nazari |
| 8,205,746 B2 | 6/2012 | Nazari |
| 8,205,747 B2 | 6/2012 | Nazari |
| 8,616,372 B2 | 12/2013 | Wills |
| 2005/0196630 A1 | 9/2005 | Carper |
| 2006/0028014 A1 | 2/2006 | McQueeny et al. |
| 2006/0207909 A1 | 9/2006 | Tada et al. |
| 2007/0187264 A1 | 8/2007 | Hofte et al. |
| 2007/0209957 A1 | 9/2007 | Glenn et al. |
| 2008/0029417 A1 | 2/2008 | Begim |
| 2009/0101534 A1 | 4/2009 | Wills |
| 2010/0105534 A1 | 4/2010 | Nazari |
| 2010/0170821 A1 | 7/2010 | Grosskopf |
| 2010/0230315 A1 | 9/2010 | Nazari |
| 2010/0236723 A1 | 9/2010 | Nazari |
| 2011/0213092 A1 * | 9/2011 | Boyce et al. .................. 525/310 |
| 2012/0228178 A1 | 9/2012 | Nazari |

* cited by examiner

GLUE APPLICATION METHOD FOR COLD SEAL COHESIVE PACKAGING

PRIORITY

This application is related to, and claims the priority benefit of, U.S. Provisional Application Ser. Nos. 61/636,210 filed on Apr. 20, 2012, 61/636,226 filed on Apr. 20, 2012, and 61/636,233 filed on Apr. 20, 2012, the entire contents of which are incorporated herein by reference.

BACKGROUND

Conventional packaging for the retail sale of consumer products has evolved to include display packs that not only allow unobstructed viewing of a product without opening the packaging, but also prevent tampering with the product, deter theft of the product, and limit retailer costs of an unsaleable product due to damage to the packaging. Among the types of consumer packaging developed to address these needs is a clear plastic blister pack in combination with a cardboard, corrugated fiberboard, or paperboard frame that encloses the outer edges of the blister pack. The product is enclosed inside the blister pack, and the combination of the blister pack and the corrugated frame prevents easy access to the product. This type of packaging deters theft by providing a bulky package, and it also provides a protective shield to the enclosed product while still allowing a consumer to view the product.

Traditionally, the corrugated frame used in combination with plastic blister pack is made up of two sheets of material adhered together with an adhesive, such as a hot melt glue, a heat-sensitive adhesive, or a cohesive contact adhesive. However, these adhesives and their respective application processes have several disadvantages. For instance, hot melt glues are typically difficult to apply in a controlled fashion, and the quality of the resulting seal varies accordingly. Heat-sensitive adhesives often provide ineffective seals when used with corrugated substrates because the corrugated sheets are poor heat conductors. Such adhesives are also difficult to use in a high volume manufacturing process where corrugated frames must be stacked in an efficient manner because the adhesive is slow to dry and is also susceptible to smearing when coming into contact with another surface. Furthermore, as the corrugated frames are stacked higher and higher, the accumulation of weight in the stack increases the possibility of the frames adhering to each other once the adhesive has been applied. Finally, conventional cohesive contact adhesives also suffer from these and other drawbacks in that they are applied over the entire interior surface of the corrugated packaging, creating waste, slowing the production process, and inevitably leaving an undesirable adhesive residue on the plastic blister pack, which impacts the recyclability of the blister pack when separated from the corrugated frame.

The abovementioned conventional adhesives create excess waste both during the manufacturing process and once the product is removed from the packaging by a consumer. In recent years, there has also been an increased awareness of the environmental impact from the manufacture, use and disposal of product packaging. While both the plastic blister pack and corrugated frame used in conventional packaging are separately recyclable, the adhesive is not and, thus, can impact the recyclability of the rest of the packaging. It is therefore desirable to use an adhesive that causes a minimal environmental impact when disposed.

Accordingly, a need exists for a method of efficiently applying an adhesive for product packaging at high production rates that enables a combination plastic blister pack and corrugated product packaging container that is cost-effective to produce, environmentally friendly to manufacture and dispose, and sufficiently protects a product during shipping, handling, and display.

SUMMARY

According to one aspect of the present disclosure, a method of applying a cold seal cohesive for product packaging is disclosed, the method including the steps of delivering a cold seal adhesive to a nip between a rotating metering roller and an adjacent rotating transfer roller having a transfer surface; transferring a quantity of adhesive is to the transfer surface; rotating the transfer roller whereby the transfer surface contacts a printing die mounted to a rotating die roller disposed adjacent the transfer roller, whereby at least a first portion of the quantity of adhesive is transferred from the transfer surface to the printing die; feeding a housing between the die roller and an adjacent rotating impression roller, wherein the housing comprises an interior surface, an opposing exterior surface, a top portion, a bottom portion, and at least one adhesive region on the interior surface, and wherein the impression roller is capable of supporting the exterior surface of the housing, whereby simultaneous rotation of the die roller and the impression roller advances the housing therebetween; rotating the die roller whereby the printing die contacts the at least one adhesive region on the interior surface of the housing and transfers at least a second portion of the quantity of adhesive from the printing die to the at least one adhesive region as the housing advances between the die roller and the impression roller; and drying the adhesive on the housing, wherein the adhesive is a latex-based adhesive, with a viscosity of no more than 450 centipoise, which adheres to the housing when applied in a liquid form but is capable of drying such that the dried adhesive lacks tackiness and is cohesive only to itself when compressed with a pressure.

In at least one embodiment of the present disclosure, the transfer roller further includes a plurality of cells engraved into the transfer surface of the transfer roller, the cells being capable of accepting the quantity of the adhesive from the nip, wherein the cells contact the printing die mounted to the rotating die roller disposed adjacent the transfer roller, whereby the adhesive is transferred from the cells to the printing die. In at least one embodiment of the present disclosure, the housing is capable of a folded configuration whereby the interior surface of the top portion at least partially contacts the interior surface of the bottom portion.

In at least one embodiment of the present disclosure, the method further includes the steps of folding the housing having a cold seal adhesive applied thereon into the folded configuration; and applying at least 10,000 pounds per square inch of pressure to at least a portion of the exterior surface of the housing opposite the adhesive region when the housing is in the folded configuration. In at least one embodiment of the present disclosure, the adhesive is delivered to the nip using a peristaltic pump. In at least one embodiment of the present disclosure, the adhesive is dried on the housing one or more dryers and is advanced to the one or more dryers by a plurality of feed rollers. In at least one embodiment of the present disclosure, the one or more dryers is selected from a group consisting of radio-wave dryers, macro-wave dryers, and infrared dryers.

In at least one embodiment of the present disclosure, a method for applying a cold seal adhesive includes the steps of delivering a cold seal adhesive to a volume within a chambered doctor blade disposed adjacent a rotating transfer roller having a transfer surface; transferring a quantity of adhesive is to the transfer surface from the volume of the chambered doctor blade; rotating the transfer roller whereby the transfer surface contacts a printing die mounted to a rotating die roller disposed adjacent the transfer roller, whereby at least a first portion of the quantity of adhesive is transferred from the transfer surface to the printing die; feeding a housing between the die roller and an adjacent rotating impression roller, wherein the housing comprises an interior surface, an opposing exterior surface, a top portion, a bottom portion, and at least one adhesive region on the interior surface, and wherein the impression roller is capable of supporting the exterior surface of the housing, whereby simultaneous rotation of the die roller and the impression roller advances the housing therebetween; rotating the die roller whereby the printing die contacts the at least one adhesive region on the interior surface of the housing and transfers a second portion of the quantity of adhesive from the printing die to the at least one adhesive region as the housing advances between the die roller and the impression roller; and drying the adhesive on the housing, wherein the adhesive is a latex-based adhesive, with a viscosity of no more than 450 centipoise, which adheres to the housing when applied in a liquid form but is capable of drying such that the dried adhesive lacks tackiness and is cohesive only to itself when compressed with a pressure.

In at least one embodiment of the present disclosure, a method for sealing product packaging using a cold seal adhesive includes the steps of applying a cold seal adhesive within at least one adhesive region on an interior surface of a housing, the housing further comprising an exterior surface opposite the interior surface, a top portion, a bottom portion, a perimeter, and at least one adhesive region on the interior surface; folding the housing into a folded configuration, wherein the folded configuration comprises the interior surface of the top portion at least partially contacting and the interior surface of the bottom portion; and applying at least 10,000 pounds per square inch of pressure to the exterior surface of the housing opposite the at least one adhesive region when the housing is in the folded configuration, thereby sealing the housing, wherein the adhesive is a latex-based adhesive, with a viscosity of no more than 450 centipoise, which adheres to the housing when applied in liquid form, is capable of drying such that the dried adhesive lacks tackiness, and is cohesive only to itself when compressed with a pressure of at least 10,000 pounds per square inch.

In at least one embodiment of the present disclosure, the step of applying pressure is enabled by a cold seal compressor that includes a plurality of sealing roller pairs mechanically connected to a rotatable drive spline, the drive spline being mechanically coupled to a motor, whereby the motor powers rotation of the drive spline, wherein each sealing roller pair is capable of advancing the housing between each sealing roller pair while applying a sealing pressure between 10,000 and 40,000 pounds per square inch therebetween. In at least one embodiment of the present disclosure, the plurality of sealing roller pairs each include at least one upper sealing roller mounted on a rotatable upper roller shaft, the upper roller shaft supported by at least one upper bearing disposed adjacent the upper sealing roller; and at least one opposing lower sealing roller mounted on a rotatable lower roller shaft, the lower roller shaft supported by at least one lower bearing disposed adjacent the lower sealing roller, wherein the at least one lower sealing roller is disposed adjacent the at least one upper sealing roller.

In at least one embodiment of the present disclosure, the plurality of sealing roller pairs each further include at least one upper gear disposed on the upper roller shaft adjacent the at least one upper bearing; and at least one lower gear disposed on the lower roller shaft adjacent the at least one lower bearing, wherein the at least one upper gear is mechanically coupled to a corresponding at least one lower gear and the at least one lower gear is mechanically coupled to the drive spline. In at least one embodiment of the present disclosure, the plurality of sealing roller pairs each further include at least one guard covering each of the at least one upper sealing roller and the at least one lower sealing roller, the guard configured to prevent an operator from inserting a finger, clothing, or other item between the rotating sealing roller pairs or gears.

In at least one embodiment of the present disclosure, at least two of the plurality of sealing roller pairs are positioned on the same plane and separated by a distance less than a width of the housing, whereby the housing is sealed along at least two sides of the perimeter of the housing. In at least one embodiment of the present disclosure, guides align the housing with the at least two sealing roller pairs as the housing is advanced therebetween. In at least one embodiment of the present disclosure, at least one pair of the plurality of sealing roller pairs is mounted to a platform capable of translating along the drive spline, whereby the distance separating at least two of the plurality of sealing roller pairs is adjustable. In at least one embodiment of the present disclosure, at least two of the plurality of sealing roller pairs are positioned on the same plane and perpendicular to at least two other pairs of the plurality of sealing roller pairs.

BRIEF DESCRIPTION OF THE DRAWINGS

The described embodiments and other features, advantages and disclosures contained herein, and the manner of attaining them, will become apparent and the present disclosure will be better understood by reference to the following description of various exemplary embodiments of the present disclosure taken in conjunction with the accompanying drawings, wherein.

Like reference numerals indicate the same or similar parts throughout the several figures.

Figure 1:
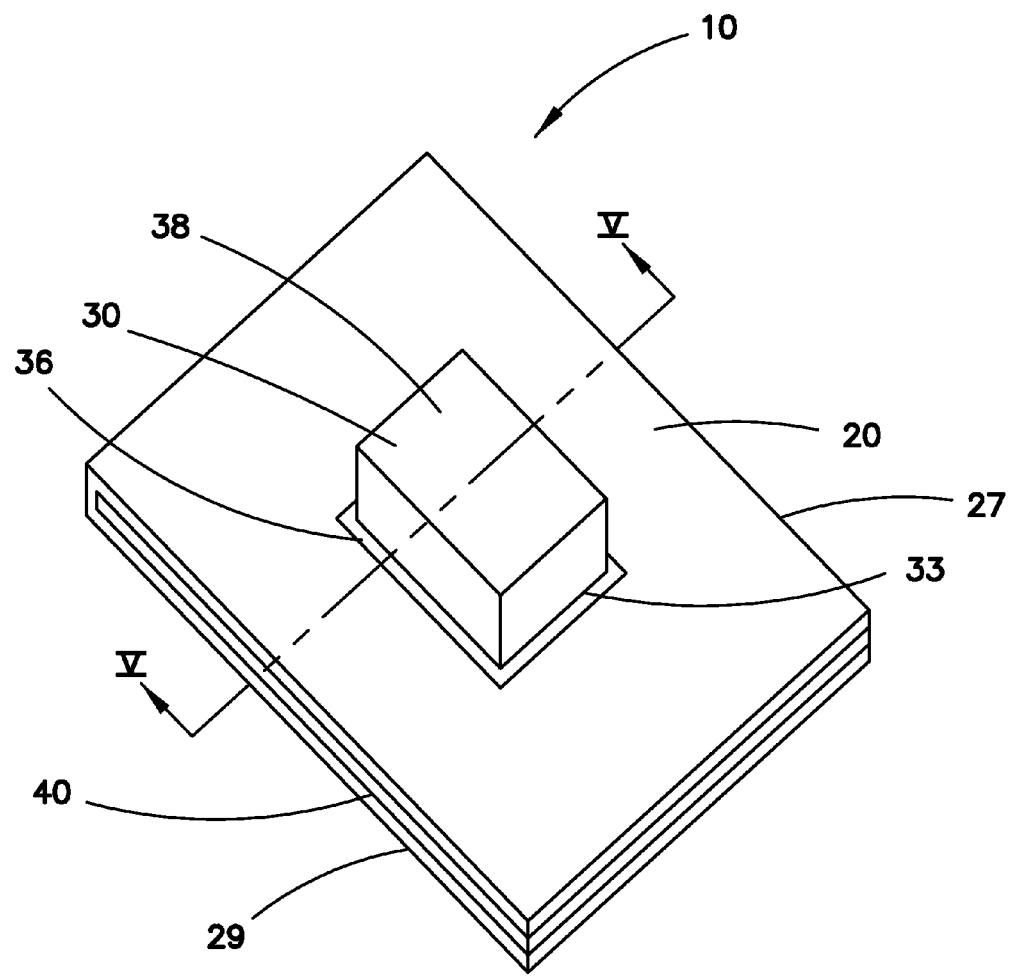
FIG. 1 shows a cold seal product packaging container according to the present disclosure.

An overview of the features, functions and configuration of the components depicted in the various figures will now be presented. It should be appreciated that not all of the features of the components of the figures are necessarily described. Some of these non-discussed features, such as various couplers, etc., as well as discussed features are inherent from the figures. Other non-discussed features may be inherent in component geometry or configuration.

DETAILED DESCRIPTION

For the purposes of promoting an understanding of the principles of the present disclosure, reference will now be made to the embodiments illustrated in the drawings, and specific language will be used to describe the same. It will nevertheless be understood that no limitation of the scope of this disclosure is thereby intended.

The disclosure of the present application provides a cold seal product packaging container and a method of making the same. A cold seal product packaging container may be constructed of a plastic blister pack and a corrugated fiberboard enclosure and employing a unique cold seal adhesive and adhesive application process, which results in a container that is strong, tamper-proof, and recyclable and can be manufactured at a much faster rate than conventional product packaging. Though the product packaging container may be commonly used with retail consumer products, it will be appreciated that the product packaging container is not limited to use with these specific types of products or distribution outlets and, consequently, may be used to package any article. Likewise, though the adhesive application process is described relative to a product packaging container, it will be appreciated that the adhesive application process is not limited to the specific product packaging container used to illustrate the process.

FIG. 1 shows a cold seal product packaging container according to the present disclosure. As shown in FIG. 1, the product packaging container 10 includes a housing 20, which encloses and retains a product tray 30 and is sealed together with a cold seal adhesive 40. The container 10 is configured to enclose one or more articles (not shown), such as consumer products, within the tray 30 and to protect products from damage, blemish, or theft. To adequately protect the product, the adhesive 40 must seal the housing 20 around the edges of tray 30 with sufficient strength and durability to securely support the products' weight during shipping, handling, and display of the product and to discourage tampering with the container 10 and its contents. In FIG. 1, housing 20 is shown in a folded configuration as a part of the container 10, which is the final configuration once container 10 has been fully formed and sealed as described more fully herein.

Figure 2:
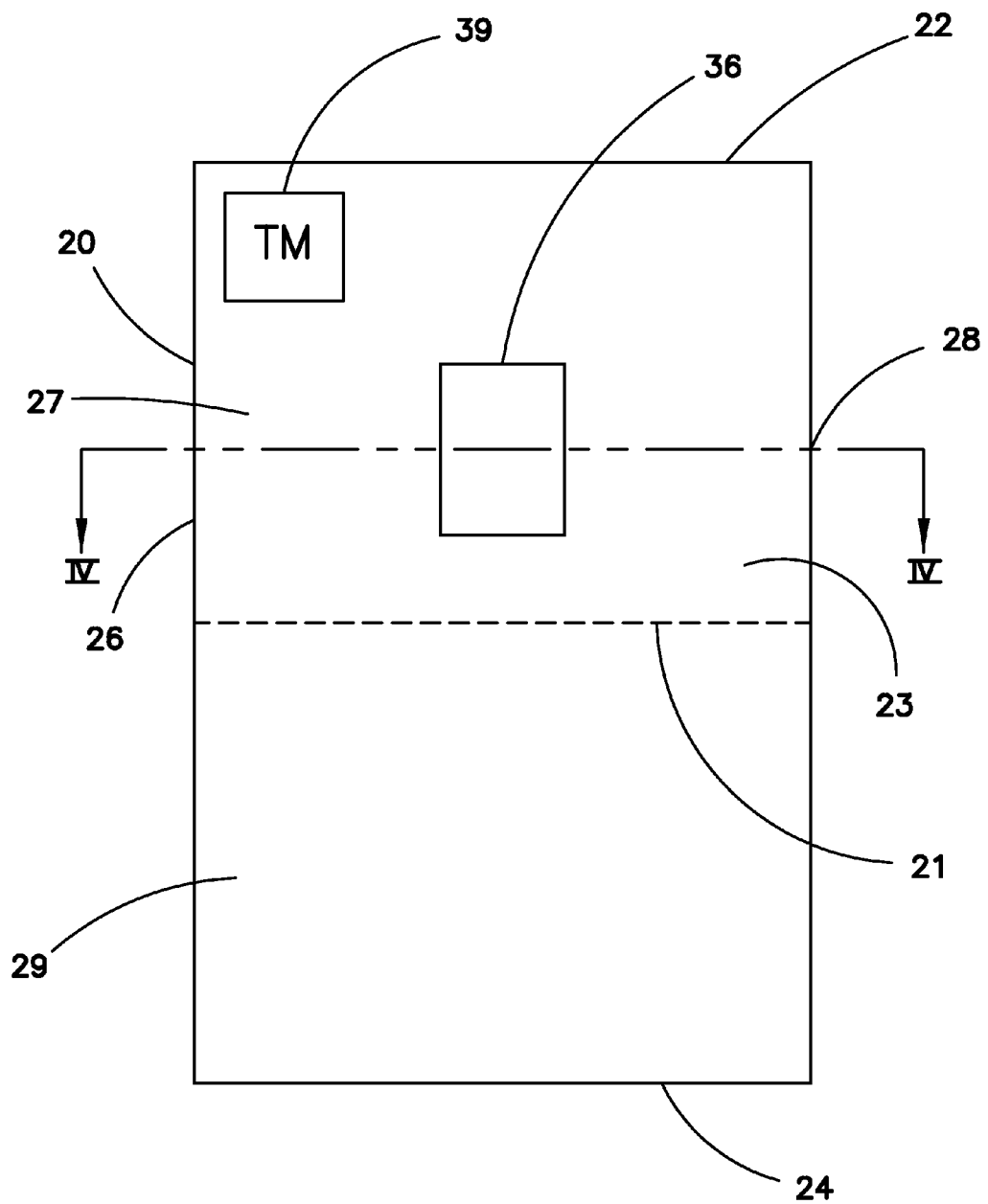
FIG. 2 shows a housing for a product packaging container according to the present disclosure.
Figure 3:
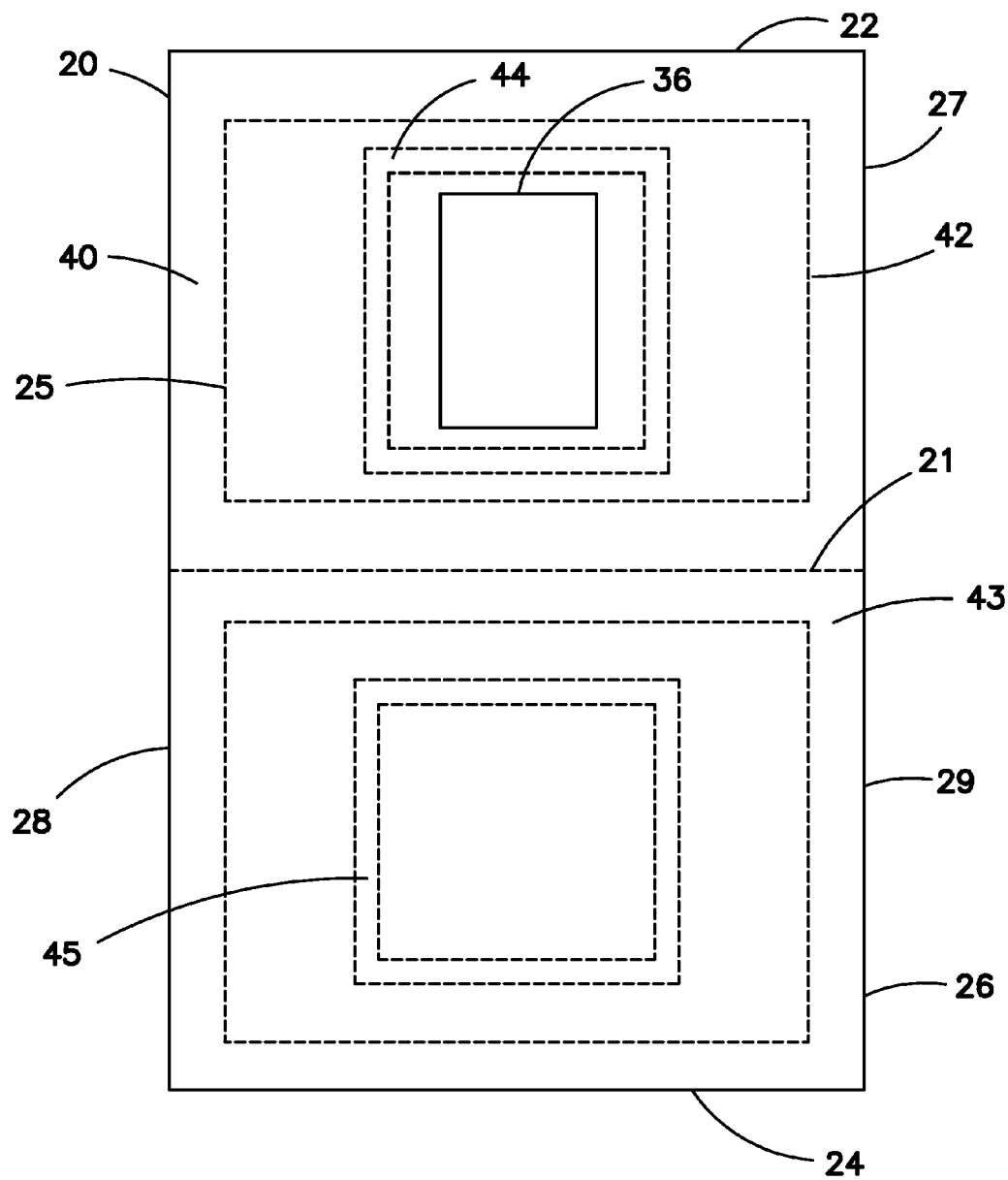
FIG. 3 shows a housing for a product packaging container according to the present disclosure.

Referring to FIGS. 2-3, housing 20 is initially manufactured in an unfolded configuration prior to assembly into the container 10 of FIG. 1. As shown in FIG. 3, the housing 20 includes an exterior surface 23 and an opposing interior surface 25 and is bounded by a leading edge 22, trailing edge 24, a first side edge 26, and second side edge 28. Further, the housing 20 is capable of being folded at a perforated line of weakness 21 located substantially equidistant from leading edge 22 and trailing edge 24. The line of weakness 21 defines a top portion 27 and a bottom portion 29, which contact one another at the interior surface 25 when the housing 20 is in the folded configuration.

According to at least one embodiment of a product packaging container according to the present disclosure, the housing 20 may include at least one opening 36 formed through the exterior and/or interior surfaces 23, 25. As shown in FIG. 1, the opening 36 may be formed to accept the tray 30, whereby a suitable opening shape is formed as disclosed in more detail herein. Though the opening 36 is depicted as being formed through the top portion 27, the housing 20 may include one or more additional openings 36 formed in either the top portion 27 and/or the bottom portion 29. Further, the exterior surface 23 may include graphic indicia 39 identifying or advertising the product contained within container 10, displaying regulatory nutrition information, a universal product code or matrix barcode, or any other information relevant to the product. The indicia 39 may be printed on the exterior surface 23 by any suitable process or may be applied as a label to the exterior surface 23.

The housing 20 may be formed of corrugated fiberboard, such as E flute corrugated fiberboard, paperboard, cardboard, chipboard, corrugated plastic board, or any planar material suitable for the requirements of a product packaging container 10 as disclosed herein. The packaging container 10 may also be made using numerous other substrates for housing 20, such as 32 ECT E-flute, 32 ECT B-Flute, 200 lb test B-flute, and various microflutes (N&F), etc. Embodiments described herein we are not limited to corrugated cardboard, as conventional packages use corrugated cardboard for both "sheets" of their housing. Embodiments described herein may use virtually any paperboard substrate in any combination. For example, embodiments may use an E-flute backer card with a SBS or chipboard front card to form a housing 20 for package container 10. Approximately 20% of the marketplace uses corrugated/corrugated sheet combinations, whereas the remaining 80% of the marketplace uses either chipboard/SBS or some combination of chipboard/SBS and corrugated. Embodiments described herein may be used with more varieties of materials than conventional packaging provides. Though the housing 20 is shown with a rectangular shape, the perimeter of the housing 20 could form any desired shape and size.

Figure 5:
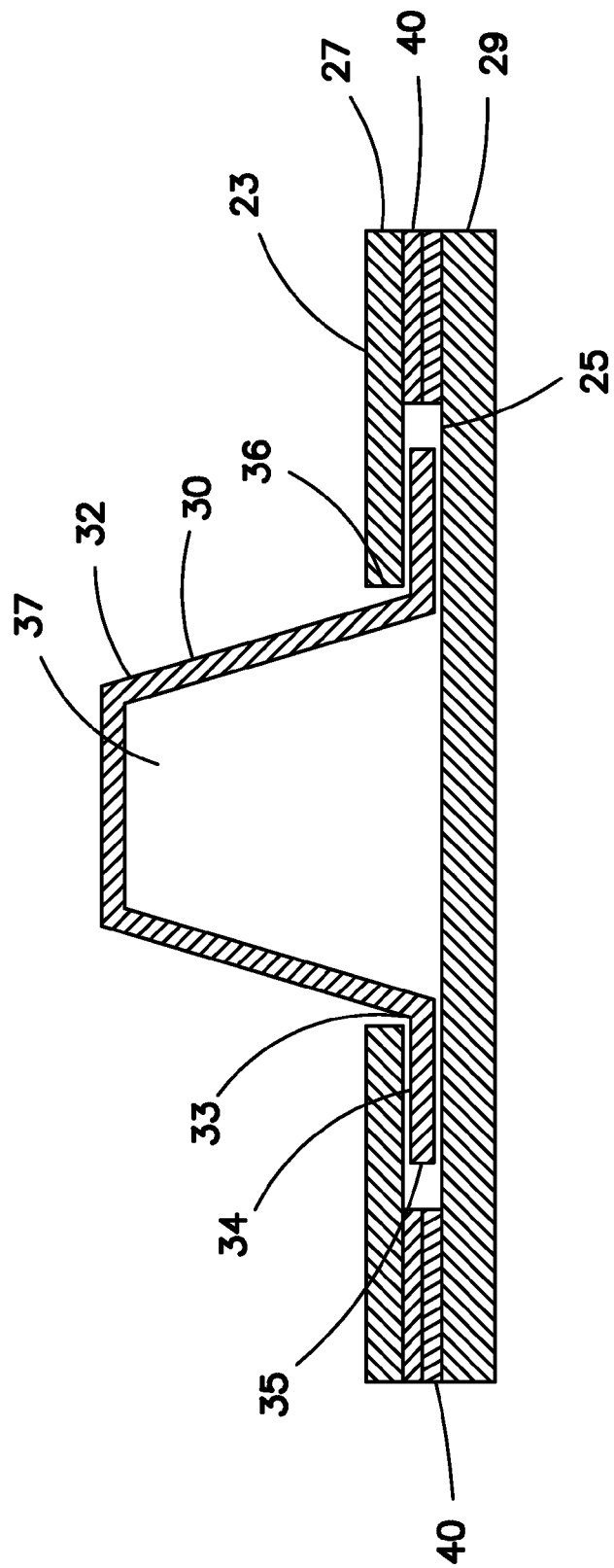
FIG. 5 shows a cross-sectional view of a housing for a product packaging container according to the present disclosure, taken across line V-V of FIG. 1.

In at least one embodiment of a product packaging container according to the present disclosure, the tray 30 includes a blister portion 32 and a flange portion 34 as shown in FIG. 5. The blister portion 32 is formed to define a product volume 37 and a blister perimeter 33 appropriately sized to accept and conform to a specific product to be packaged within the container 10. The flange portion 34 extends in a plane from the blister perimeter 33 and defines a flange perimeter 35. The flange portion 34 enables the tray 30 to be trapped between the top portion 27 and bottom portion 29 when the housing 20 is in the folded configuration while further enabling the blister portion 32 to project through the opening 36. In at least one embodiment of the present disclosure as shown in FIGS. 1 and 5, the opening 36 in housing 20 is formed to be the same as or slightly larger than the blister perimeter 33 but substantially smaller than the flange perimeter 35, further enabling secure handling and display of the product within container 10. It should be noted that the width of the flange portion 34 may vary with the size and weight of the product to be secured within the container 10. Larger and heavier products may generally require a wider flange portion 34 to adequately distribute the weight of the product to the housing 20 and to securely retain the flange portion 34 between the top portion 27 and bottom portion 29 in the folded configuration.

The tray 30 may be made of any material suitable for secure shipping, handling, and display of the product within the container 10. Exemplary materials may include clear plastic materials, such as polyethylene terephthalate, that can be molded or thermoformed into a shape generally conforming to the product to be secured within the container 10.

As mentioned above, adhesive 40 binds top portion 27 and bottom portion 29 and seals product tray 30 within product packaging container 10. Adhesive 40 is a quick-drying, latex-based adhesive that, once dried, creates a no-tack surface and adheres only to other surfaces coated with the same adhesive when placed under high pressure. In the embodiment shown in FIG. 3, adhesive 40 may be applied to interior surface 25 within upper adhesive region 42, lower adhesive region 43, upper product adhesive region 44, and the lower product adhesive region 45. When housing 20 is folded at weakness 21 and sufficient pressure is applied to the housing 20, the adhesive 40 in the upper adhesive region 42 bonds with the adhesive 40 in the lower adhesive region 43, and the adhesive 40 in the upper product adhesive region 44 bonds with the adhesive 40 in the lower product adhesive region 45. The secure bonding of these regions occurs only when sufficient pressure of at least 10,000 pounds per square inch (psi) is applied to the adhesive by a cold seal compressor or other sealing device.

The cold seal adhesive 40 is specially formulated to provide the characteristics described herein. The cold seal adhesive 40 is an emulsion of natural and/or synthetic latex rubber in aqueous solution of ammoniated water with a solids content between 15 and 65 percent by weight. The viscosity of the cold seal adhesive 40 may be between 10 and 450 centipoise (cP) at 20 revolutions per minute and 23 degrees Celsius (° C.) per ASTM D1084 Test Method B. Further, the density of cold seal adhesive 40 may be between 8.0 and 9.0 pounds per gallon (lb/gal) at 25° C., and the basicity or pH may be between 9.5 and 12 pH. The composition of cold seal adhesive 40 may contain dispersants, surfactants, tackifiers, isocyanates, stabilizers, and antifoaming agents, as is well known in the art, without deviating from the scope of the disclosure. In at least one embodiment of the present disclosure, cold seal adhesive 40 has the following properties: the solids content is 57.5 percent by weight, the viscosity is 75 cP at 25° C., the density is 8.3 lb/gal, and the pH is 10.0. In at least one embodiment of the present disclosure, the adhesive 40 has a solids content between 45 and 58 percent by weight, a viscosity between 75 and 200 cP at 23° C., a density between 8.3 and 8.7 lb/gal at ° C., and a basicity between 10 and 11 pH. Viscosity may be measured using ASTM D1084 Test Method B using a Brookfield viscometer or ASTM D1084 Method D using Zahn Cups.

Being a latex-based adhesive, the viscosity of the cold seal adhesive 40 increases dramatically under processing conditions that induce shear stress in the adhesive, causing shear thickening or agglomeration. Likewise, the cold seal adhesive 40 exhibits high shear viscosity, which is a measure of resistance to flow at the high shear rates imposed by the application process. However, to reduce shear sensitivity, the cold seal adhesive 40 has significantly lower viscosity and solids content than conventional cohesive adhesives used in the product packaging art. Further, the low viscosity and solid content enable the cold seal adhesive 40 to be applied and effective at a film thickness between 0.007-0.002 inches (in.) and typically 0.0015 in. Nonetheless, various processing issues must be overcome to prevent inducing shear stress in the adhesive and achieve the noted film thickness range during application at high production rates.

Figure 6:
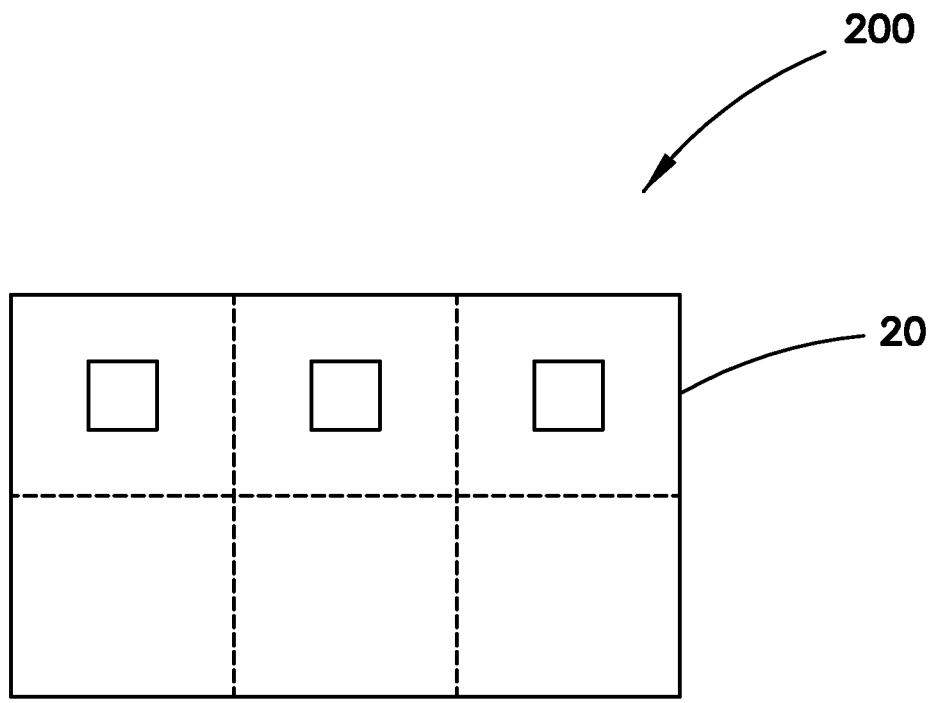
FIG. 6 shows a housing web for a product packaging container according to the present disclosure.

Because adhesive 40 dries quickly and is only applied to the interior surface 25 of housing 20, the use of adhesive 40 allows multiple housings to be stacked on top of one another during the manufacturing process, as the exterior surface 23 of one housing will not adhere to the interior surface 25 of another housing. The ability to immediately stack multiple housings 20 after application of adhesive 40 greatly improves the efficiency of the manufacturing process compared to prior art processes using conventional adhesives in which the adhesives were slow to dry and were susceptible to smearing when coming into contact with the other surfaces. Prior art manufacturing processes were also limited in the number of housings that could be stacked together, as each accumulation of weight in a stack of housings increased the possibility of the housings adhering to each other. Often housings are transported standing on end instead of lying flat to avoid adhering the housings together (commonly referred to as "blocking"); however, the housings are susceptible to damage when transported this way. Unlike conventional packaging using contact adhesives, housings 20 produced by the adhesive application method of the present disclosure may be handled, stacked, stored, and transported in economically efficient quantities without sticking together because of the rapid drying process and the lack of tack achieved of the dried adhesive 40. The properties and application method of adhesive 40 also enable the adhesive 40 to be applied prior to cutting housing 20, as an entire sheet of housings 200, as shown in FIG. 6 could pass through the machinery without adhesive 40 smearing or leaving residue on the machinery.

Figure 4:
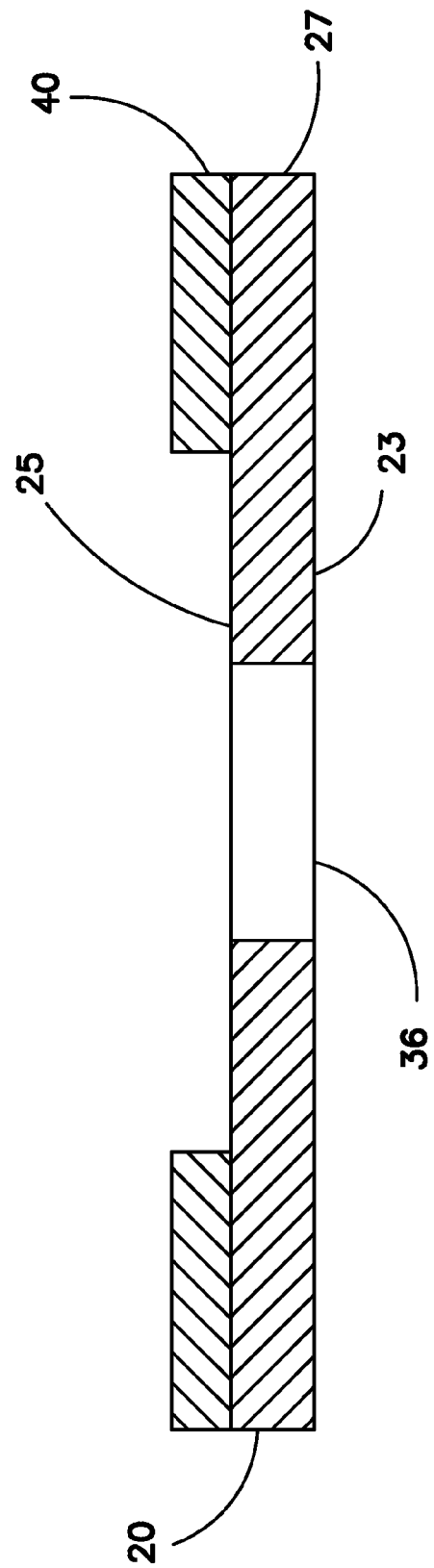
FIG. 4 shows a cross-sectional view of a housing for a product packaging container according to the present disclosure, taken across line IV-IV of FIG. 2.

As mentioned above, in at least one embodiment of a product packaging container according to the present disclosure, the adhesive 40 may be applied in specific adhesive regions on the interior surface 25 of the housing 20. As depicted in FIGS. 3 and 4, the adhesive 40 may be applied along a perimeter of the housing 20 within an upper adhesive region 42 and a lower adhesive region 43 that extend along each of the leading, trailing, first and second side edges 22, 24, 26, 28 and the line of weakness 21, whereby the upper adhesive region 42 on the top portion 27 substantially contacts the lower adhesive region 43 on the bottom portion 29 when the housing 20 is in the folded configuration. Because the adhesive will only adhere to itself under high pressure, any adhesive region located on the top portion 27 of housing 20 should have a corresponding adhesive region on the bottom portion 29. As shown in FIG. 4, the perimeter adhesive region 42 may extend from the an edge 22, 24, 26, 28 toward the center of the interior surface 25 but may not extend as far as the opening 36 as to avoid contact between the adhesive 40 and the tray 30. In at least one embodiment of the present disclosure, the width of the upper and lower adhesive regions 42, 43 extend no more than 12.9 millimeters (0.5 inches) toward the center of the interior surface 25. Applying the adhesive 40 in the narrow perimeter upper and lower adhesive regions 42, 43 prevents any contact between the adhesive 40 and the tray 30, which facilitates recyclability of the container 10 by enabling easy separation of the tray 30 from the housing 20 without leaving contaminating adhesive 40 on the tray 30.

Alternatively, as shown in FIG. 3, a product packaging container 10 may include an upper product adhesive region 44 and a lower product adhesive region 45 or any number of other adhesive regions separated from the perimeter adhesive regions 42, 43 by a region without adhesive 40. Regardless, to facilitate recyclability of container 10, the upper and lower product adhesive regions 44, 45 should be located so as not to contact the tray 30.

In addition to facilitating recyclability of container 10, the total area of the interior surface 25 occupied by the perimeter adhesive region 42 may be reduced to minimize the amount of adhesive 40 included in the container 10. Minimizing the adhesive region 42 reduces the cost of container 10 by both reducing the amount of materials used and increasing the rate of production of the housing 20. Nonetheless, a suffice amount of adhesive 40 must be used to ensure the top and bottom portions 27, 29 of housing 20 are sealed together with sufficient strength and durability as required for a specific container 10 as disclosed herein.

Traditionally, high speed printing press processes, for example, flexographic printing, are anticipated to induce shear stresses in a material used for printing, generally inks, on a substrate. Because inks are not generally adversely affected by the levels of shear stress induced by conventional processes, operators have not had a need to modify their high speed printing press processes to reduce the shear stresses induced. However, some adhesive materials, such as the cold seal adhesive 40, are sensitive to shear as described above. Consequently, conventional high speed printing processes are not capable of applying the cold seal adhesive 40 without inducing the shear stress responsible for agglomeration of the adhesive. As a result, various modifications must be made to a conventional flexographic printing press to enable continuous, high speed application of the cold seal adhesive 40, as disclosed herein. With proper application, the cold seal adhesive 40 enables production rates not possible using conventional packaging adhesives. For example, the cold seal adhesive 40 may be applied at a production rate of 3,300 feet per minute (ft/min), compared to 45 ft/min for conventional application processes and adhesives. Further, the cold seal adhesive 40 may be applied prior to a die cutting operation, unlike conventional adhesives, thereby allowing the die cutting operation to be included within the application process and providing additional production efficiencies.

Adhesive 40 may be applied to housing 20 by a modified flexographic printing process that uses a flexible relief die to control application of and minimize induced shear stress in the adhesive 40. The process may include using a set of cylindrical rollers, positioned adjacent to each other, which rotate relative to one another and are capable of metering, transferring and printing adhesive 40 on housing 20. Those of ordinary skill in the art may recognize other machinery to effectively apply the adhesive. Once the adhesive 40 has quickly dried, the adhesive regions in the top portion 27 and bottom portion 29 will only bond to each other upon the application of high pressure from a cold seal compressor or other sealing device. Since the adhesive 40 is only applied to a limited number of adhesive regions, only those regions need to be sealed rather than the entire surface as in prior art packaging. This highly controlled application process not only reduces the amount of adhesive 40 needed for the final container 10, but also allows the adhesive 40 to be applied so that it is not in direct proximity to the product being packaged or the product tray 30.

Figure 7:
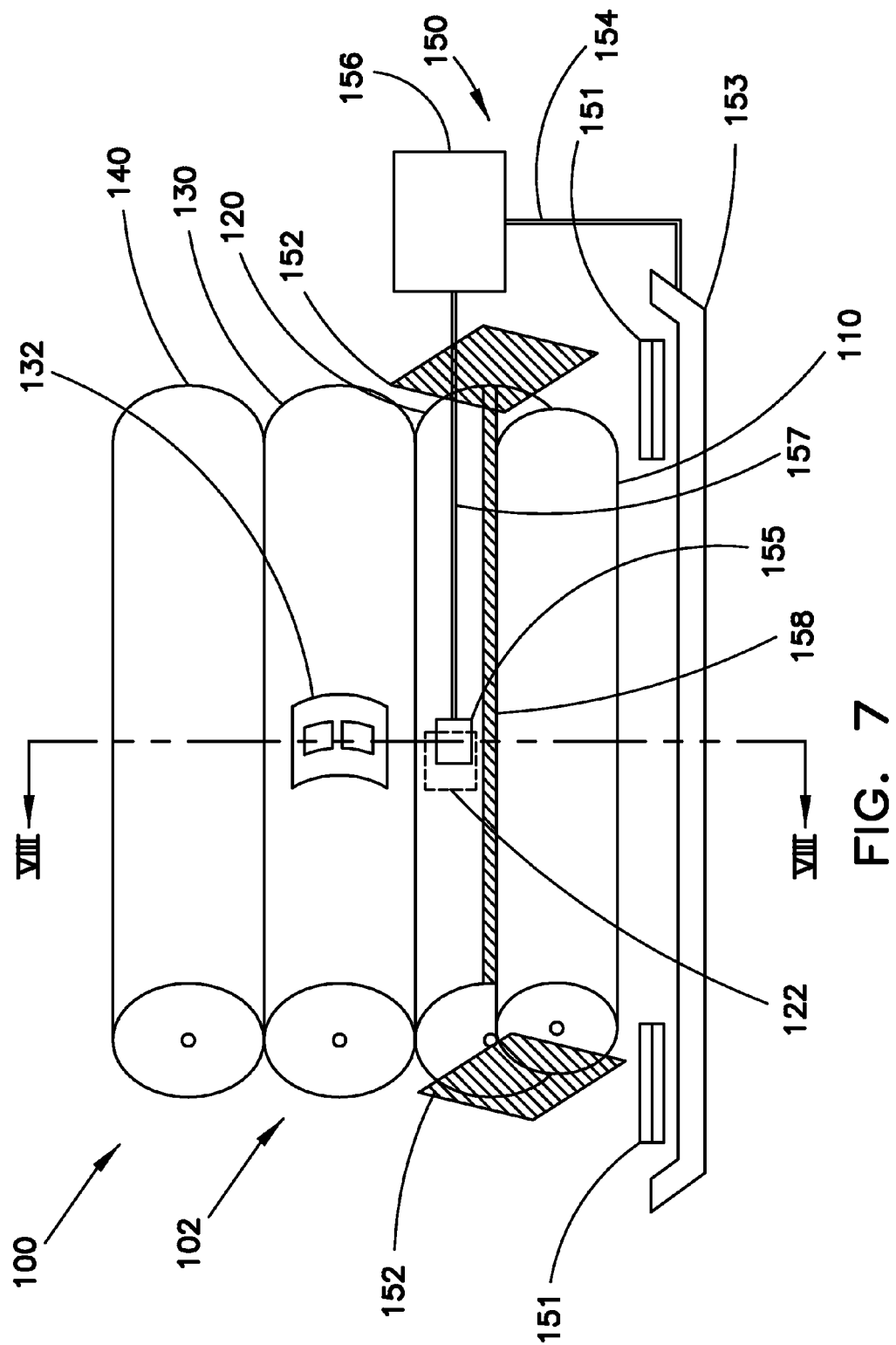
FIG. 7 shows a perspective view of an adhesive application apparatus for an adhesive application method according to the present disclosure.

FIG. 7 shows an apparatus for applying the adhesive for product packaging according to the present disclosure. As shown in FIG. 7, adhesive application apparatus 100 includes a set of cylindrical rollers 102, which are positioned adjacent one another, rotate relative to one another around their respective axes, and are thereby capable of metering, transferring, and printing the adhesive 40 on a substrate, such as housing 20. The adhesive application apparatus 100 resembles a conventional in-line flexographic printing machine commonly used to print ink on packaging materials, such as housing 20. However, due to the shear sensitivity of adhesive 40, a conventional in-line flexographic printing machine is not capable of continuously applying adhesive 40 effectively or efficiently. As a latex-based adhesive, the viscosity of the adhesive 40 increases dramatically under high-shear conditions due to shear thickening or agglomeration. Essentially, the adhesive 40 is activated by shear stress and will begin to crosslink, congeal, and agglomerate due to shear stress induced in the adhesive 40 by the application process. Concurrently, conventional high speed application processes, such as flexographic printing, are disposed to inducing significant shear stress in an adhesive. Consequently, the adhesive application apparatus 100 differs in many respects from a conventional in-line flexographic printing machine, as described below, and therefore enables the adhesive application apparatus 100 to apply the adhesive 40 discretely within the top and bottom adhesive regions 42, 43.

As shown in FIG. 7, the set of cylindrical rollers 102 may include a metering roller 110 disposed adjacent a transfer roller 120. The set of cylindrical rollers 102 may further include a die roller 130 adjacent the transfer roller 120, which is capable of applying a controlled amount of adhesive 40 onto a printing die 132 mounted on the die roller 130. An impression roller 140 may be positioned adjacent the die roller 130 and separated at a distance that permits the housing 20 to pass therebetween, thus enabling the printing die 132 to contact the interior surface 25 and imprint the adhesive 40 within the perimeter adhesive regions 42, 43 while the impression roller 140 contacts and supports the exterior surface 23.

Figure 8:
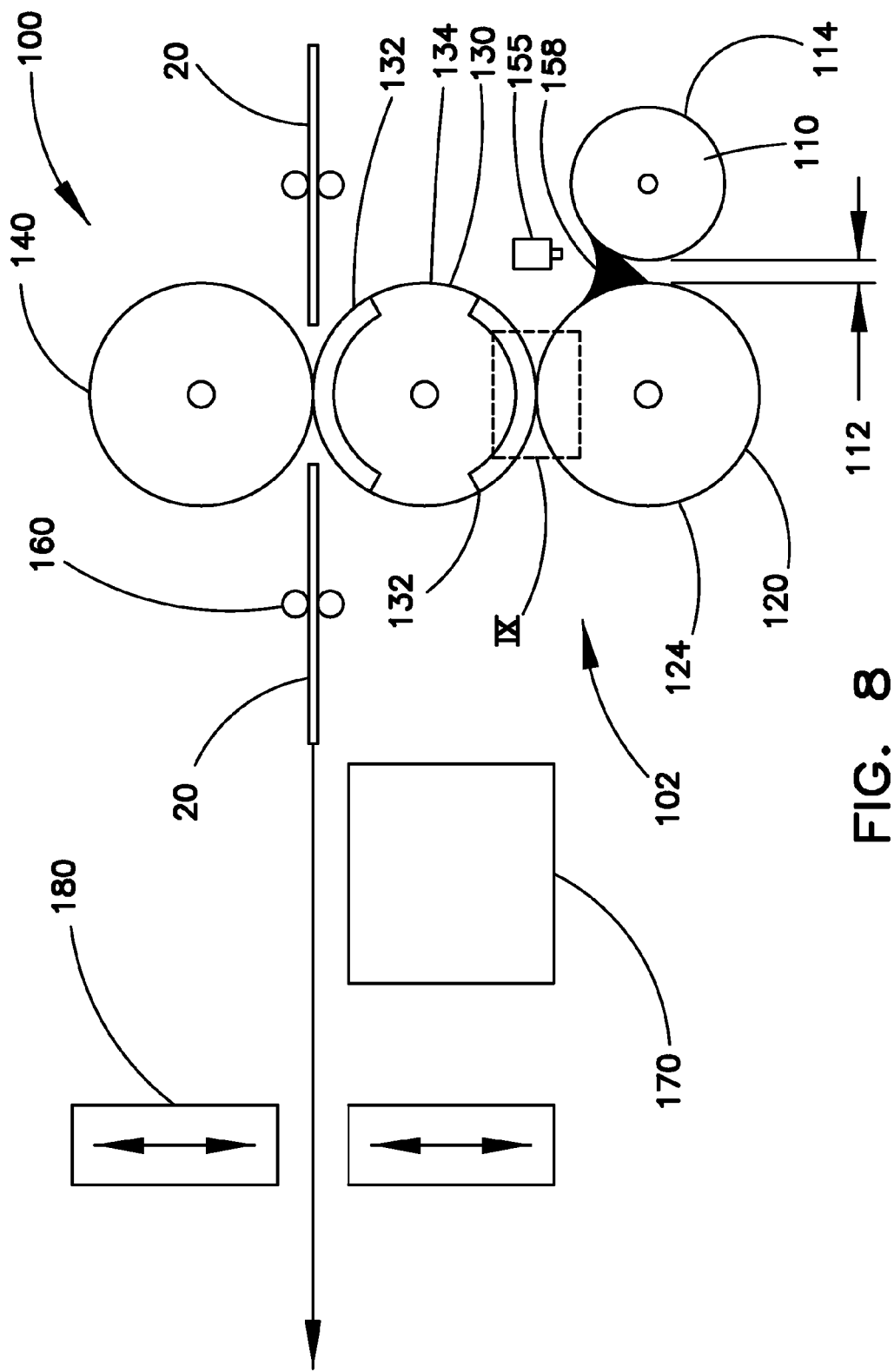
FIG. 8 shows a side view of an adhesive application apparatus for an adhesive application method according to the present disclosure.

As shown in FIG. 8, the metering roller 110 is positioned adjacent to the transfer roller 120 such that a nip gap 112 separates the outer surfaces of the metering roller 110 and the transfer roller 120. The purpose of the metering roller 110 is to control the amount of adhesive 40 carried by the transfer roller 120 to the printing die 132 and, to that extent, may be analogous to that of a doctor blade used in a conventional flexographic printing process. Accordingly, the adhesive 40 is dispensed into the nip gap 112 from a dispense nozzle 155, as shown in FIG. 7. The nip gap 112 is set such that it enables an amount of adhesive 40 to pool or puddle between the metering 110 and the transfer 120 rollers. The pool of adhesive 40 formed between the metering 110 and the transfer 120 rollers is commonly referred to as a nip 158. However, due to the shear sensitivity of the adhesive 40, the nip gap 112 must be set to ensure that shear forces do not cause the adhesive to polymerize and congeal into a film on the metering 110 and the transfer 120 rollers.

The purpose of the transfer roller 120, which may be commonly referred to as an anilox roller, is to apply the proper amount of adhesive 40 on the printing die 132. Accordingly, the transfer roller 120 includes a surface 124, which may be engraved with a plurality of small cells 122 that accept the adhesive 40 from the metering roller 110. Alternatively, the transfer roller 120 need not include the cells 122 and may instead transfer the adhesive 40 to the printing die 132 directly from the surface 124. The cells 122 may be engraved mechanically or by laser to form a plurality of volumes into the surface 124 of the transfer roller 120. The cells 122 may be have a variety of shapes known in the art, including trihelical, pyramid, quadrangular, hexagonal, or hexagonal channel screen. Several characteristics of the transfer roller 120 determine the amount of adhesive 40 that will be transferred to the printing die 132, such as the angle, volume, and line screen density of the cells 122. In an exemplary embodiment of the present disclosure, the transfer roller 120 has a cell line screen density between 100-300 lines per linear inch (LPI) and typically 200 LPI. Typically, lower cell volumes transfer less adhesive. Conversely, low line screen density will allow for a heavy layer of adhesive 40 to be transferred, whereas high line screen density will permit finer detail in adhesive application. As is known in the printing art, cell volume and line screen density are closely correlated. Accordingly, one skilled in the art having the benefit of this disclosure may recognize that other combinations of cell volume and line screen density may perform equally well in the adhesive application apparatus 100.

The metering roller 110 may be constructed of a shaft or core of metal or other hard material covered with an elastomeric covering. The elastomeric covering may be made of neoprene, Buna N (a copolymer of butadiene and acrylonitrile), ethylene propylene diene monomer (EPDM), polyurethane, natural rubber, or other suitable material. The transfer roller 120 may be constructed of a shaft or core of metal or other hard material covered with a hard, engravable material, such as ceramic, stainless steel, or chrome-plated nickel/copper alloy.

Figure 9:
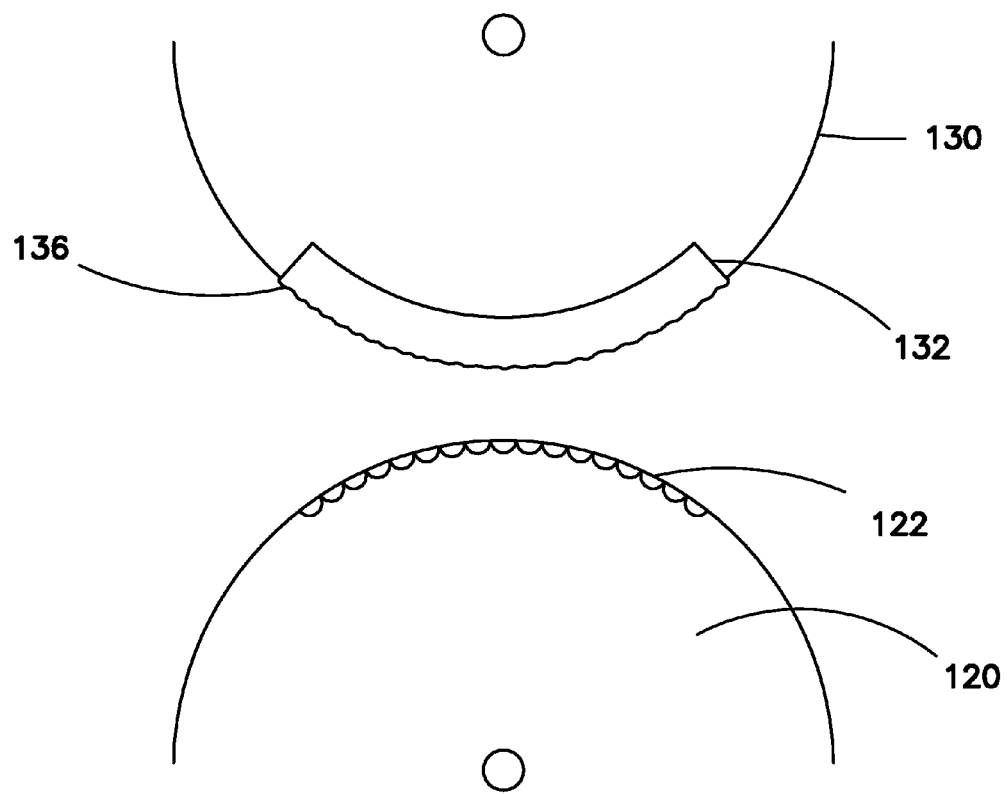
FIG. 9 shows a detail view taken from FIG. 8 of an adhesive application apparatus for an adhesive application method according to the present disclosure.

As shown in FIG. 7, the die roller 130 is positioned adjacent to and configured to rotate in the opposite direction from the transfer roller 120. A printing die 132 is mounted on the die roller 130 such that it is proud of the surface 124 of the die roller 130 and aligned to contact the transfer roller 120. The rotation of the transfer roller 120 and the die roller 130 may be closely timed to enable the printing die 132 to contact the cells 122 on the transfer roller 120. For clarity FIG. 9 depicts the transfer roller 120 separated at a distance from the die roller 130; however, in at least one embodiment the transfer roller 120 may contact the die roller 130. As depicted in FIG. 9, as the surface of the printing die 132 contacts the cells 122, the adhesive 40 temporarily adheres to the printing die 132 due to the surface energy of the printing die 132, thereby transferring a controlled amount of the adhesive 40 from the cells 122 to the printing die 132. The printing die 132 is essentially a relief plate made of a flexible and resilient material capable of transferring the adhesive 40 from the cells 122 to the housing 20, including natural rubber, synthetic elastomeric polymer, and photopolymer that crosslinks upon exposure to ultraviolet energy. As depicted in FIG. 9, the contact surface 136 of the printing die 132 may be course and porous to facilitate acceptance of the adhesive 40 from the cells 122 of the transfer roll 120 and subsequent deposition on the housing 20.

Alternatively, the transfer roller 120 need not include the cells 122 and may instead transfer the adhesive 40 to the printing die 132 directly from the surface 124.

As shown in FIG. 7, the impression roller 140 is positioned adjacent to and configured to rotate in the opposite direction from the die roller 130. In operation, as the die roller 130 rotates, a housing 20 is fed between the impression roller 140 and the die roller 130 such that the printing die 132 contacts the housing 20 and applies the adhesive 40 to the upper and lower adhesive regions 42, 43 of the housing 20. The purpose of the impression roller 140 is to support and apply pressure to the exterior surface 23 of the housing 20 as the printing die 132 contacts the interior surface 25. The impression roller 140 also assists to feed the housing 20 across the printing die 132. Accordingly, the impression roller 140 may be made of any suitable material that is capable to supporting the housing 20 with sufficient pressure to enable adequate transfer of the adhesive 40 from the printing die 132 to the housing 20 and to feed the housing 20 across the printing die 132.

The die roller 130 may have a plurality of printing dies 132 mounted thereon to enable the application of adhesive 40 onto multiple housings 20 with each rotation of the die roller 130. FIG. 6 shows an example of a housing web 200 for use with the adhesive application apparatus 100. The housing web 200 may comprise three adjacent, uncut housings 20, but those of ordinary skill in the art will understand that housing webs used with the present invention can comprise any number of housings. By way of example, where the housing web 200 is processed through the adhesive application apparatus 100 of the present disclosure, the die roller 130 may be configured with a grouping of six printing dies 132 corresponding to the upper and lower adhesive regions 42, 43 of each individual housing 20 within the housing web 200.

In addition to the die roller 130 and the impression roller 140, the adhesive application apparatus 100 includes a plurality of feed rollers 160 that further assist to convey the housing 20 or housing web 200 through the apparatus.

As shown in FIG. 8, the adhesive 40 is dispensed into the nip 158 by an adhesive dispense system 150, which controls the flow rate of the adhesive 40 and avoids inducing shear stress in adhesive 40 that may cause the adhesive 40 to congeal and clog the application apparatus 100. The adhesive dispense system 150 may also include a pump 156 fluidly connected to a supply line 157 that is further fluidly connected to a dispense nozzle 155. The pump 156 may deliver adhesive 40 via the supply line 157 to the dispense nozzle 155, which dispenses adhesive 40 into the nip 158. As noted herein, the adhesive 40 is sensitive to shear and must be delivered to the nip 158 without creating significant shear stress in the adhesive 40. Consequently, the pump 156 may be a non-shearing pump such as a diaphragm pump or a peristaltic pump.

Figure 10:
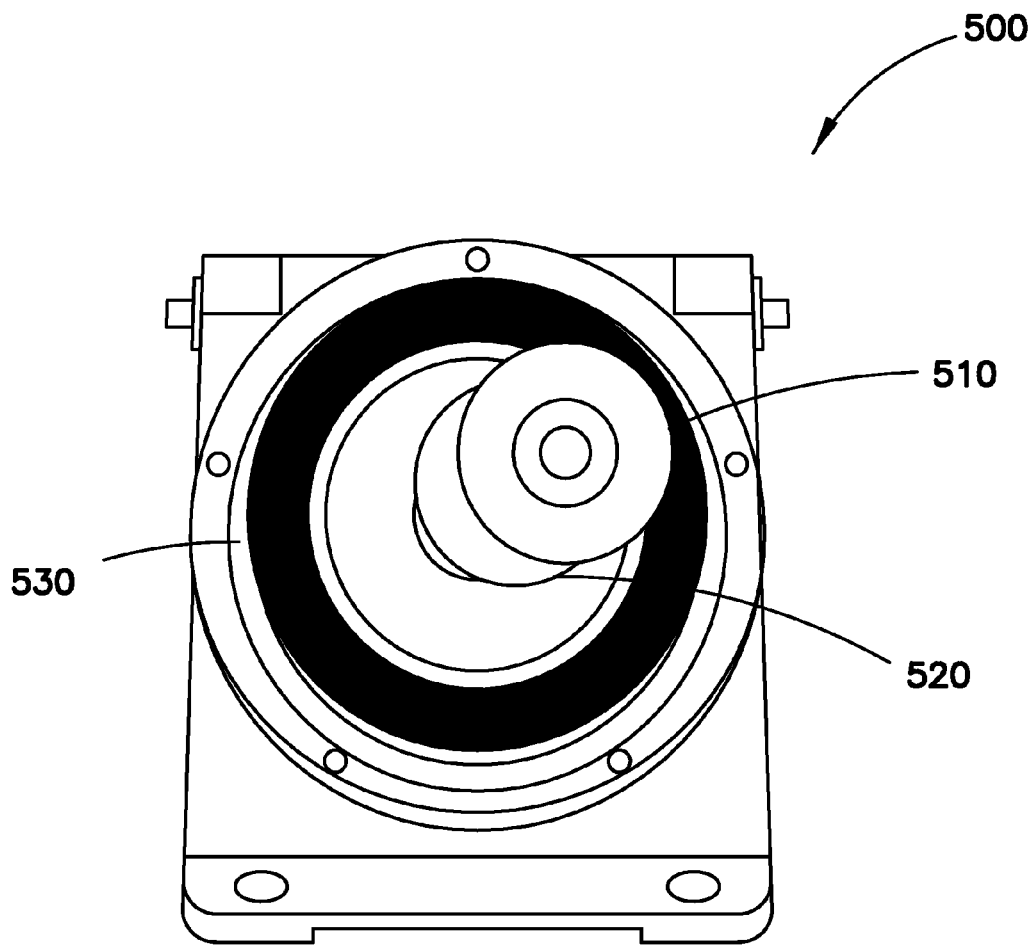
FIG. 10 shows a pump for an adhesive application apparatus for an adhesive application method according to the present disclosure.

As shown in FIG. 10, according to one embodiment of the present disclosure, the pump 156 may be a 360-degree peristaltic pump 500 that includes a single pump roller 510 rotatably attached to an eccentric shaft 520. The pump roller 510 compresses a low friction hose 530 through 360 degrees of rotation. The benefits of the peristaltic pump 500 include more adhesive flow per revolution with only one compression and expansion per cycle, which reduces shear stress in the adhesive 40. To further reduce shear stress, the pump roller 510 may be configured to minimize the occlusion of the hose 530, which also contributes to in longer pump life. In at least one embodiment of the pump 156, the occlusion may be between 90-98%. Moreover, the peristaltic pump 500 is capable of delivering long, steady streams of adhesive 40, which enables the pump 500 run relatively slowly and contributes to in longer pump life while also minimizing shear stress in the adhesive 40. Alternatively, the pump 156 may be a low shearing diaphragm or dual diaphragm pump well-known in the art.

Shear stress is also a concern at each axial end of the metering 110 and transfer 120 rollers. To prevent an excessive amount of adhesive 40 from flowing out of the nip 158 and off the ends of the rollers 110, 120, a dam 152 may be placed at each end of the rollers 110, 120, as shown in FIG. 8. However, shear stress may develop in the adhesive 40 between the dam 152 and the ends of the rotating metering and transfer rollers 110, 120. To prevent the aforementioned undesirable shearing stress in the adhesive 40, the dams 152 may be allowed to float relative to the ends of the metering 110 and transfer 120 rollers. Nonetheless, some shear stress may be inevitable. Consequently, one or more screen filters 151 may be placed adjacent each dam 152, whereby any adhesive 40 that has begun to congeal due to shear stress can be removed from the adhesive flow as the adhesive 40 runs off the axial ends of the metering 110 and transfer 120 rollers and passed the dams 152. Further, at least one trough 153 may be located adjacent the screen filters 151 to collect excess run-off adhesive 40 that passes through the screen filters 151. The trough 153 may be fluidly connected to the pump 156 by a recirculation line 154 to reclaim and reuse excess run-off of adhesive 40 from the nip 158, thus minimizing waste and further improving the efficiency of the adhesive application method 800.

Referring to FIG. 8, after passing between die roller 130 and impression roller 140, the housing 20 may be conveyed passed one or more dryers 170 by the plurality of feed rollers 160. The dryers 170 act to evaporate the remaining liquid from the adhesive 40 applied to the interior surface 25 of housing 20, such that the surface tension of the dried adhesive 40 has essentially no tack. Accordingly, the dryers 170 may be any suitable energy source capable to drying the adhesive 40 within the required line rate of the adhesive application process, including infrared or macro-wave lamps, convection ovens, or the like. Because the adhesive application method 800 applies a very controlled and thin layer of adhesive 40 isolated to the segregated adhesive regions 42, 43, the adhesive 40 dries to having essentially no tack very quickly, as much as 10 times faster than conventional flow or roller coat processes.

The drying of adhesive 40 may be the rate limiting step of the adhesive application method 800, meaning that faster drying methods increase the overall rate of production of the adhesive application method 800. For example, where radio or macro-wave dryers are used and given a housing 20 approximately 19 inches long, the adhesive application method 800 may produce 5000-6000 coated housings per hour continuously. Where infrared dryers are used 3000-4000 coated and similarly-sized housings per hour may be produced continuously. In addition, these throughput rates may be further increased by processing a plurality of housings 20 in the same pass using the housing web 200. Therefore, where the housing web 200 includes three adjacent housings 20, as shown in FIG. 6, the production rates may be as much as three times greater than disclosed.

In at least one embodiment of an adhesive application method 800 of the present disclosure, as shown in FIG. 8, the plurality of feed rollers 160 may convey the housing 20 through a die punch 180 capable of forming one or more openings 36 through the housing 20. It should be noted that the housing 20 may be fed through die punch 180 before or after application of adhesive 40, unlike conventional packaging adhesive processes that must perform the die punch process prior to application of the adhesive.

Figure 19:
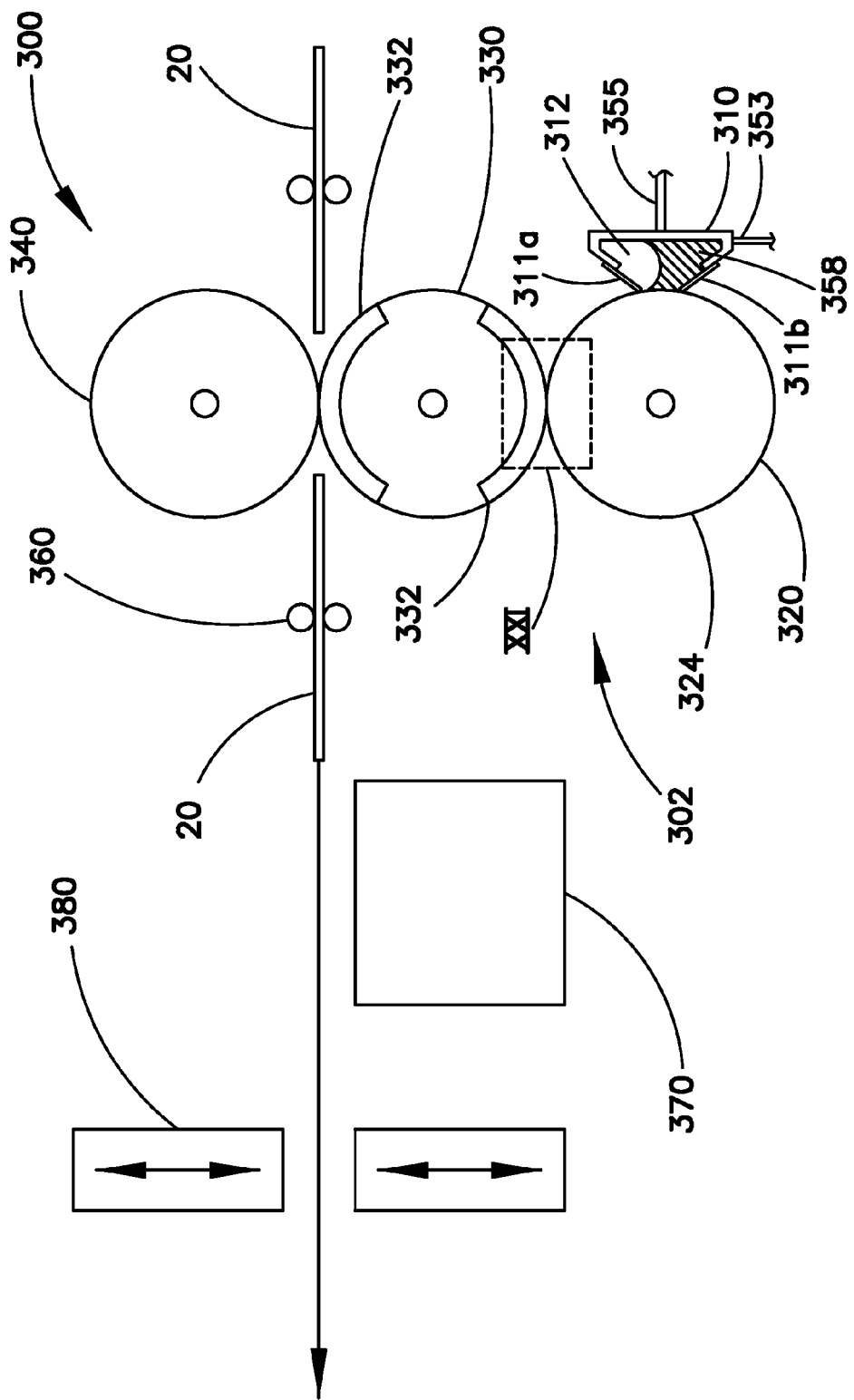
FIG. 19 shows a side view of an alternative adhesive application apparatus for an adhesive application method according to the present disclosure.

FIG. 19 shows an alternative apparatus for applying the adhesive for product packaging according to the present disclosure. As shown in FIG. 19, an adhesive application apparatus 300 is similar to the adhesive application apparatus 100; however, the apparatus 300 embodies a number of significant differences. For instance, instead of a metering roll, such as the metering roll 110 of the apparatus 100, the apparatus 300 may include a chambered doctor blade 310. Accordingly, the apparatus 300 may include a set of cylindrical rollers 302, including the chambered doctor blade 310 disposed adjacent a transfer roller 320 with a die roller 330 adjacent the transfer roller 320. The set of cylindrical rollers 302 may further include an impression roller 340 positioned adjacent the die roller 330 and separated at a distance that permits the housing 20 to pass therebetween, thus enabling a printing die 332 mounted to the die roller 330 to contact the interior surface 25 and imprint the adhesive 40 within the perimeter adhesive regions 42, 43 while the impression roller 340 contacts and supports the exterior surface 23.

The chambered doctor blade assembly 310 enables precise metering and application of the adhesive 40 onto the transfer roll 320. The chambered doctor blade assembly 310 may include an upper blade 311a and a lower blade 311b mounted to a chamber 314 such that the tips of the upper blade 311a and the lower blade 311b contact the transfer roller 320 and define a closed nip volume 312. The chamber 314 may include an inlet 355 for delivery of the adhesive 40 into the nip volume 312 and an outlet 353 for draining excess adhesive 40. In operation, the upper blade 311a and lower blade 311b may be positioned such that a pool of adhesive 40, commonly referred to as a nip 358, forms within the nip volume 312 and contacts the transfer 320 roller. The nip 358 is formed by adhesive 40 supplied via the inlet 355. The upper blade 311a and lower blade 311b are further positioned such that a sufficient, but not excessive, amount of adhesive 40 is transferred to the transfer roll 320 in a controlled manner. Excess adhesive 40 may be drained away from the nip volume 312 via the outlet 353. The upper blade 311a and lower blade 311b may be formed from conventional materials, such as fiberglass, acetal, metal, polyethylene, ultra-high-molecular-weight polyethylene ("UHMWPE"), or any suitable material. The shape of the tips of the upper blade 311a and lower blade 311b may be straight, beveled, or beveled with a step. A UHMWPE blade with a beveled step tip, commonly referred to as a DACC blade, enables a thicker coverage of adhesive 40 transferred to the housing 20. In at least one embodiment according to the present disclosure, the blades 311a and 311b may be DACC blades.

Figure 20:
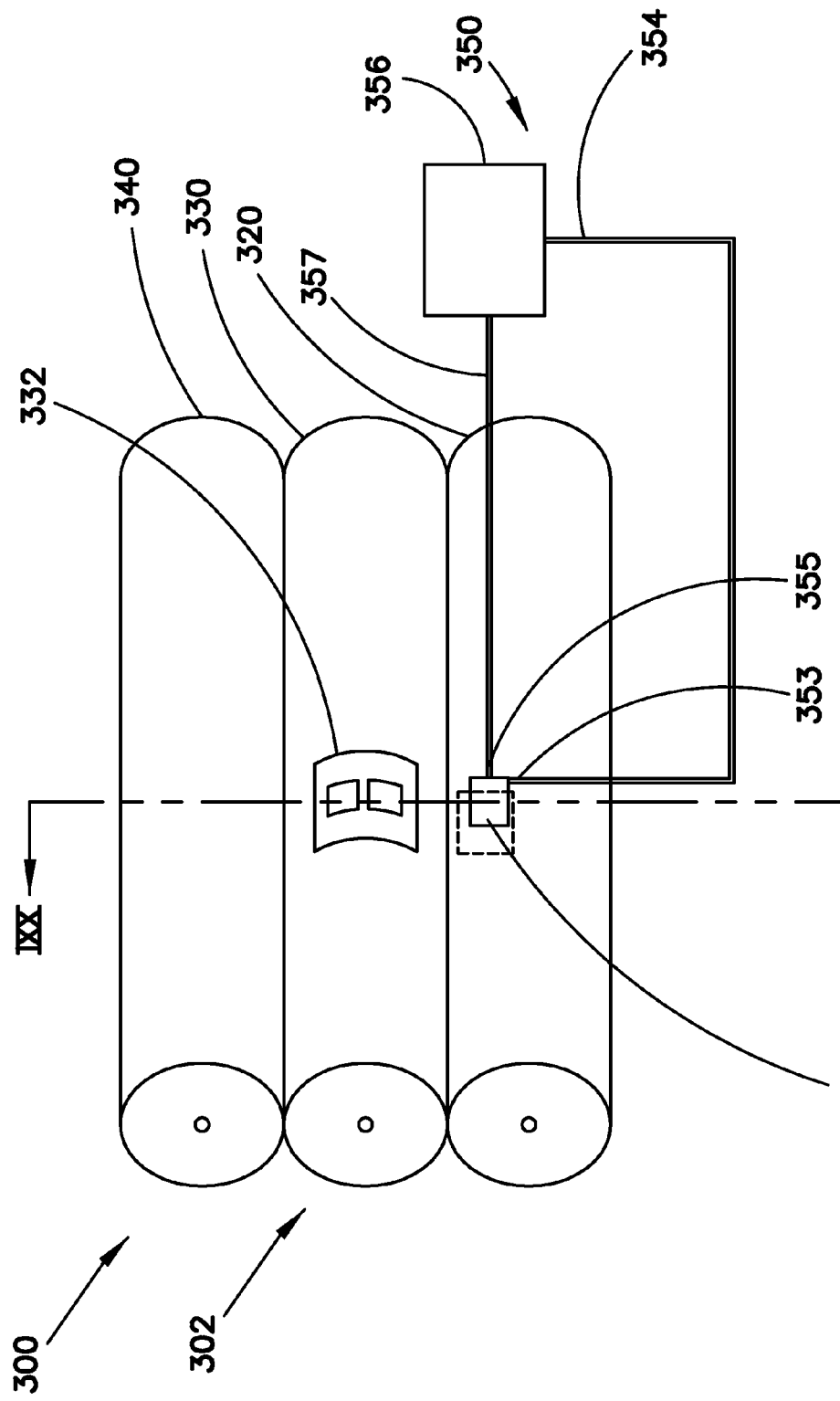
FIG. 20 shows a perspective view of an alternative adhesive application apparatus for an adhesive application method according to the present disclosure.

Because the chambered doctor blade assembly 310 provides a closed system for dispensing and metering the adhesive 40 upon the transfer roller 320, some of the dispense and recirculation components of adhesive application apparatus 100 that enable the reuse of excess adhesive 40 may not be required in the adhesive application apparatus 300. For instance, the adhesive application apparatus 300 may not include dams, filter screens, or a trough. However, as shown in FIG. 20, the adhesive application apparatus 300 may include a supply line 357 fluidly connected to a pump 356 at one end and the inlet 355 at the opposite end. The adhesive application apparatus 300 may further include recirculation line 354 fluidly connected to the pump 356 at one end and the outlet 353 at the opposite end. The pump 356 may be substantially similar to the pump 156. Additionally, as a closed system the chambered doctor blade assembly 310 minimizes induced shear in the adhesive 40 and, thereby, potential waste from agglomeration.

Figure 21:
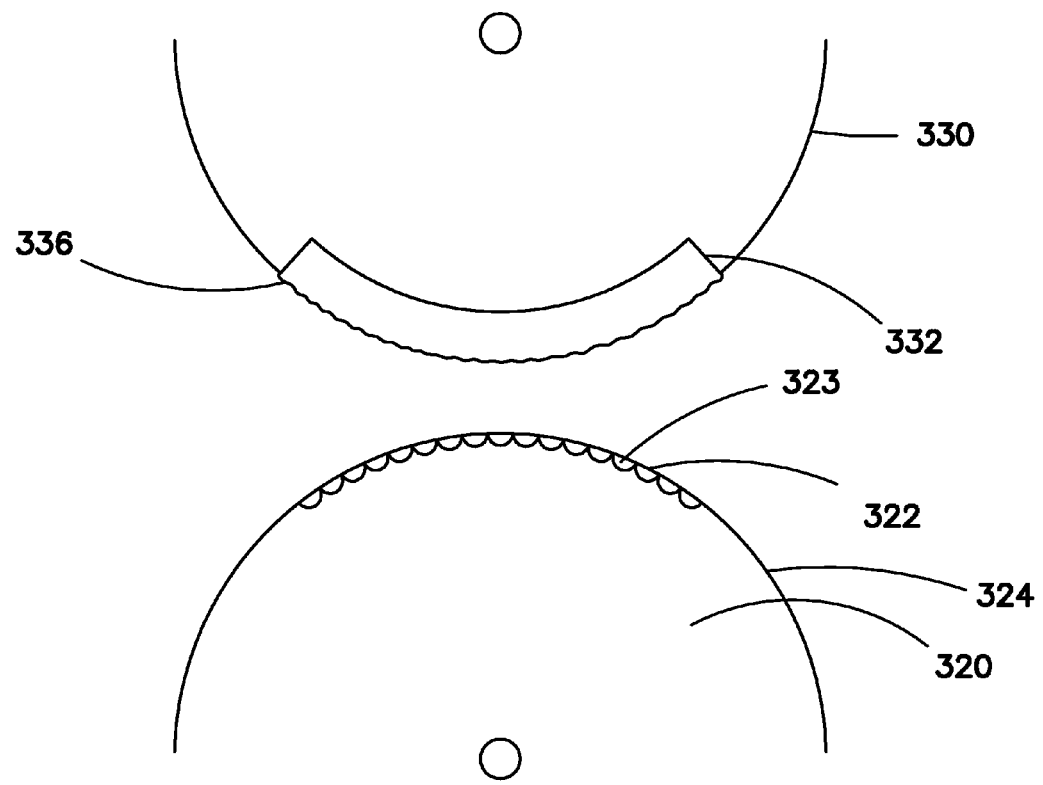
FIG. 21 shows a detail view taken from FIG. 19 of an adhesive application apparatus for an adhesive application method according to the present disclosure.

The adhesive application apparatus 300 may further differ from the adhesive application apparatus 100 with respect to transfer roller 320. The use of the chambered doctor blade assembly 310 is further enabled by the transfer roller 320, which may be commonly referred to as an anilox roller. For clarity FIG. 21 depicts the transfer roller 320 separated at a distance from the die roller 330; however, in at least one embodiment the transfer roller 320 may contact the die roller 330. As shown in FIG. 21, the transfer roller 320 may include a surface 324 having a plurality of small cells 322 engraved therein. The cells 322 may be similar in structure to the cells 122 of the transfer roller 120 except that the internal volume 323 of each of the cells 322 is larger than the volumes of the cells 122. In the printing art, the internal volume of cells engraved in an anilox roller is commonly specified in units of billion cubic microns per square inch (BCM). Larger BCM values equate to greater internal cell volumes and result in larger amounts of adhesive 40 being transferred from the transfer roller 320 to the print die 332 mounted to the die roller 330. In an exemplary embodiment of the present disclosure, the transfer roller 320 has cell volumes 323 of 40 BCM at a line screen density between 50-100 LPI and typically 60 LPI. However, one skilled in the art having the benefit of this disclosure may recognize that other combinations of cell volume and line screen density may perform equally well in the adhesive application apparatus 300. Alternatively, the transfer roller 320 need not include the cells 322 and may instead transfer the adhesive 40 to the printing die 332 directly from the surface 324.

Figure 17:
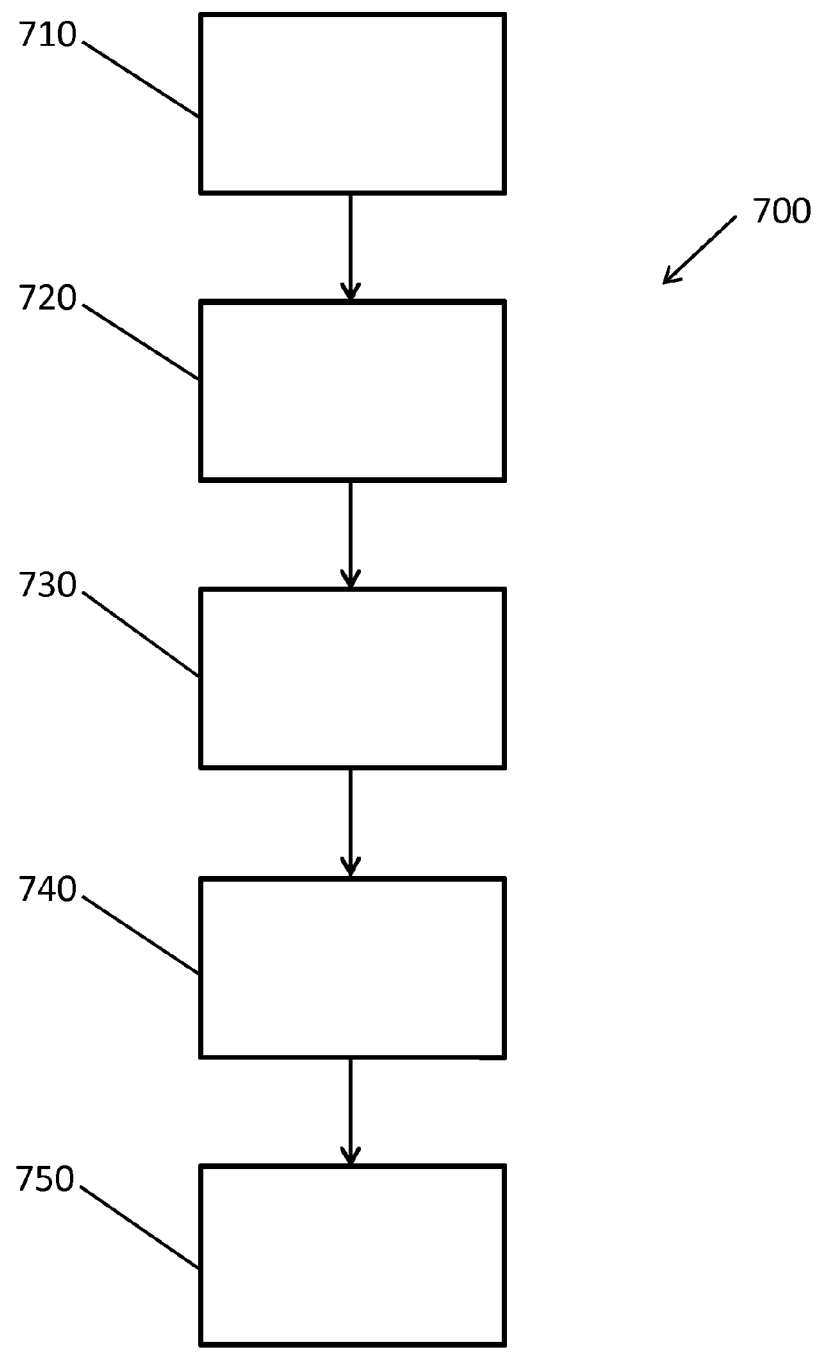
FIG. 17 shows an adhesive application method according to the present disclosure.

In at least one embodiment of the present disclosure, the adhesive 40 may be applied to the interior surface 25 of the housing 20 by an adhesive application method 700. As shown FIG. 17, the adhesive application method 700 includes a step 710 of delivering the adhesive 40 to the nip 158 between the rotating metering roller 110 and the adjacent rotating transfer roller 120, the transfer roller 120 having a pattern of cells 122 engraved into the transfer roller surface 124, the cells 122 being capable of accepting a quantity of the adhesive 40 from the nip 158. The adhesive application method 700 further includes the step 720 of rotating the transfer roller 120 whereby the cells 122 contact the printing die 132 mounted to the rotating die roller 130 positioned adjacent the transfer roller 120, whereby further the adhesive 40 is transferred from the cells 122 to the printing die 132. Moreover, the adhesive application method 700 includes the step 730 of feeding the housing 20 between the die roller 130 and the adjacent impression roller 140, wherein housing 20 includes interior surface 25, opposing exterior surface 23, top portion 27, bottom portion 29, top adhesive region 42, bottom adhesive region 43, and is capable of a folded configuration whereby the interior surfaces 25 of top portion 27 and bottom portion 29 at least partially contact each other, and wherein the die roller 130 and the impression roller 140 are capable of supporting the exterior surface 23 of housing 20. Furthermore, the adhesive application method 700 includes the step 740 of rotating the die roller 130 whereby the printing die 132 contacts top adhesive region 42 and bottom adhesive region 43 and thereby transfers the adhesive 40 from the printing die 132 to top adhesive region 42 and bottom adhesive region 43 as housing 20 advances between the die roller 130 and the impression roller 140. The adhesive application method 700 further includes the step 750 of rapidly drying the adhesive 40 on housing 20, wherein the adhesive 40 is a latex-based adhesive, with a viscosity of no more than 450 cP, which adheres to the housing 20 when applied in liquid form but is capable of drying such that the dried adhesive 40 lacks tackiness and which is only cohesive to itself when compressed with a pressure of at least 10,000 psi. Alternatively, the transfer roller 120 need not include the cells 122 and may instead transfer the adhesive 40 to the printing die 132 directly from the surface 124.

Figure 22:
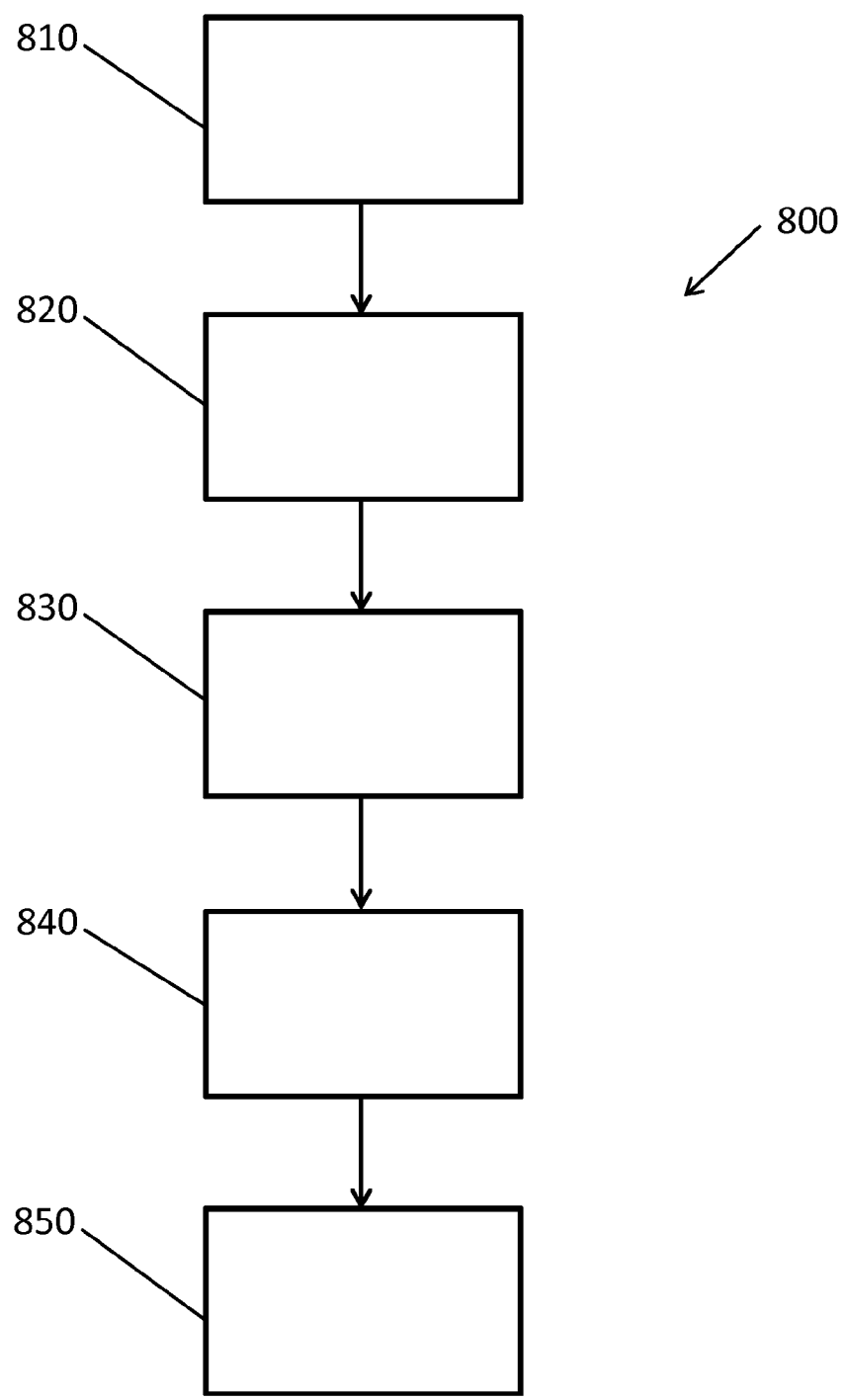
FIG. 22 shows an alternative adhesive application method according to the present disclosure.

In an alternative embodiment of the present disclosure, the adhesive 40 may be applied to the interior surface 25 of the housing 20 by an adhesive application method 800. As shown FIG. 22, the adhesive application method 800 includes a step 810 of delivering the adhesive 40 to the nip volume 358 within the chambered doctor blade assembly 310 and the adjacent rotating transfer roller 320, the transfer roller 320 having a pattern of cells 322 engraved into the transfer roller surface 324, the cells 322 being capable of accepting a quantity of the adhesive 40 from the nip volume 358. The adhesive application method 800 further includes the step 820 of rotating the transfer roller 320 whereby the cells 322 contact the printing die 332 mounted to the rotating die roller 330 positioned adjacent the transfer roller 320, whereby further the adhesive 40 is transferred from the cells 322 to the printing die 332. Moreover, the adhesive application method 800 includes the step 830 of feeding the housing 20 between the die roller 330 and the adjacent impression roller 340, wherein housing 20 includes interior surface 25, opposing exterior surface 23, top portion 27, bottom portion 29, top adhesive region 42, bottom adhesive region 43, and is capable of a folded configuration whereby the interior surfaces 25 of top portion 27 and bottom portion 29 at least partially contact each other, and wherein the die roller 330 and the impression roller 340 are capable of supporting the exterior surface 23 of housing 20. Furthermore, the adhesive application method 800 includes the step 840 of rotating the die roller 330 whereby the printing die 332 contacts top adhesive region 42 and bottom adhesive region 43 and thereby transfers the adhesive 40 from the printing die 332 to top adhesive region 42 and bottom adhesive region 43 as housing 20 advances between the die roller 130 and the impression roller 340. The adhesive application method 800 further includes the step 850 of rapidly drying the adhesive 40 on housing 20, wherein the adhesive 40 is a latex-based adhesive, with a viscosity of no more than 450 cP, which adheres to the housing 20 when applied in liquid form but is capable of drying such that the dried adhesive 40 lacks tackiness and which is only cohesive to itself when compressed with a pressure of at least 10,000 psi. Alternatively, the transfer roller 320 need not include the cells 322 and may instead transfer the adhesive 40 to the printing die 332 directly from the surface 324.

Once the adhesive 40 has been applied and dried on the housing 20, the housing 20 may be combined with the tray 30 and the product to be packaged to form the container 10, as shown in FIG. 1. Specifically, a tray 30 may be place within the opening 36 in housing 20. Subsequently, the housing 20 may be folded into the folded configuration and sealed. Because of the unique formulation of the adhesive 40, the process for sealing the top portion 27 to the bottom portion 29 of the housing 20 differs from conventional contact or cohesive adhesive sealing processes in that high pressure must be applied to the top and bottom portions 27, 29 to initiate an adequate bond within the adhesive 40. Specifically, the cohesive characteristics of the adhesive 40 are not highly pressure sensitive, meaning significant pressure must be applied to the substrate to be bound to initiate cohesion of the adhesive 40. As a result, the adhesive 40 has essentially no tack, to itself or uncoated surfaces or substrates, under common handling and processing conditions, which enables efficient shipping and handling of the finished product as disclosed herein. Further, due to the reduced pressure sensitivity and thin film thickness of the cold seal adhesive 40, conventional product packaging sealing processes used for conventional cohesive adhesives are not adequate to create a satisfactory bond between two surfaces coated with the cold seal adhesive. Consequently, to produce a satisfactory cohesive bond between two surfaces coated with the cold seal adhesive 40, a sealing pressure of more than 10,000 pounds per square inch (psi), and typically about 19,000 psi, must be applied to the surfaces to be sealed.

Figure 18:
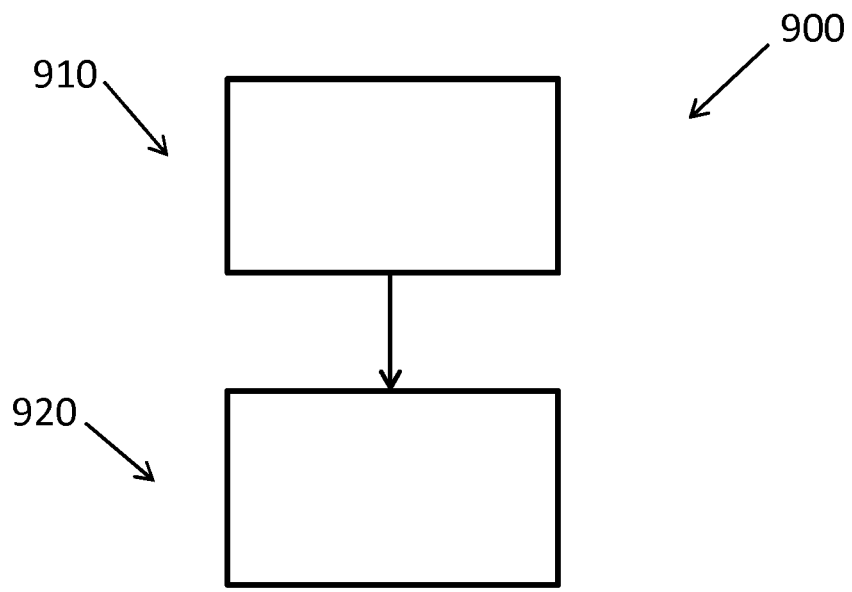
FIG. 18 shows a cold seal compressor method according to the present disclosure.

In at least one embodiment of the present disclosure, the housing 20 produced by the adhesive application method 800 may be sealed in the folded configuration by a cold seal compressor method 900 to meet the specific sealing requirements of the adhesive 40. As shown in FIG. 18, the cold seal compressor method 900 includes the step 910 of folding a housing 20 having an adhesive 40 applied thereon into the folded configuration; wherein housing 20 comprises interior surface 25, opposing exterior surface 23, top portion 27, bottom portion 29, and top adhesive region 42 and bottom adhesive region 43 on the interior surface 25; the folded configuration includes at least partial contact between the interior surfaces 25 of the top portion 27 and bottom portion 29; the adhesive 40 lies within the top adhesive region 42 and bottom adhesive region 43 of the housing 20; and the adhesive 40 comprises a latex-based adhesive, with a viscosity of no more than 450 cP, which adheres to the housing 40 when applied in liquid form but is capable of drying such that the dried adhesive 40 lacks tackiness and which is only cohesive to itself when compressed with a pressure of at least 10,000 psi. The cold seal compressor method 900 further includes the step 920 of applying at least 10,000 psi of pressure to the exterior surface 23 of the housing 20 opposite the top adhesive region 42 and bottom adhesive region 43 when the housing 20 is in the folded configuration.

Figure 11:
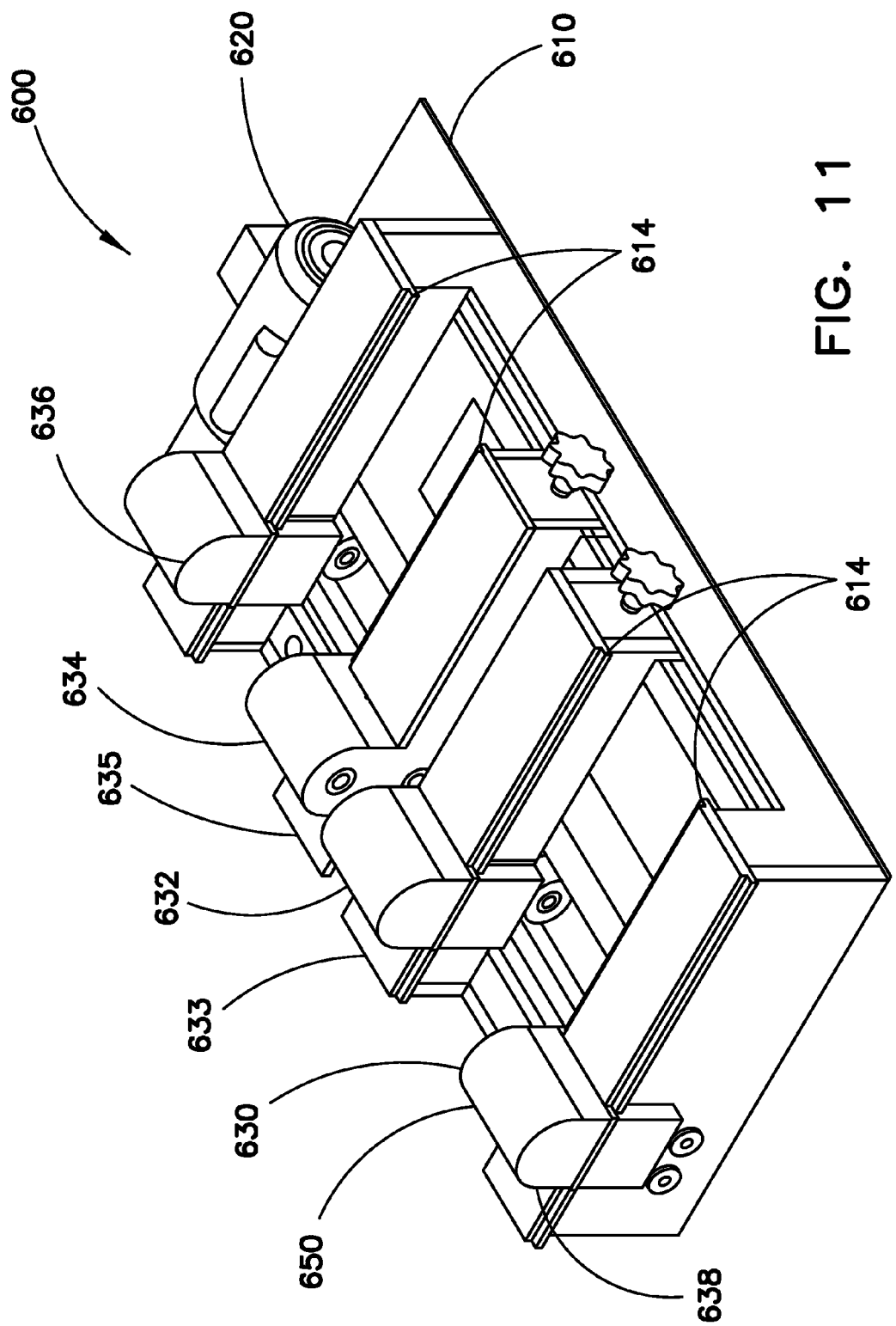
FIG. 11 shows a perspective view of a cold seal compressor for an adhesive application method according to the present disclosure.
Figure 12:
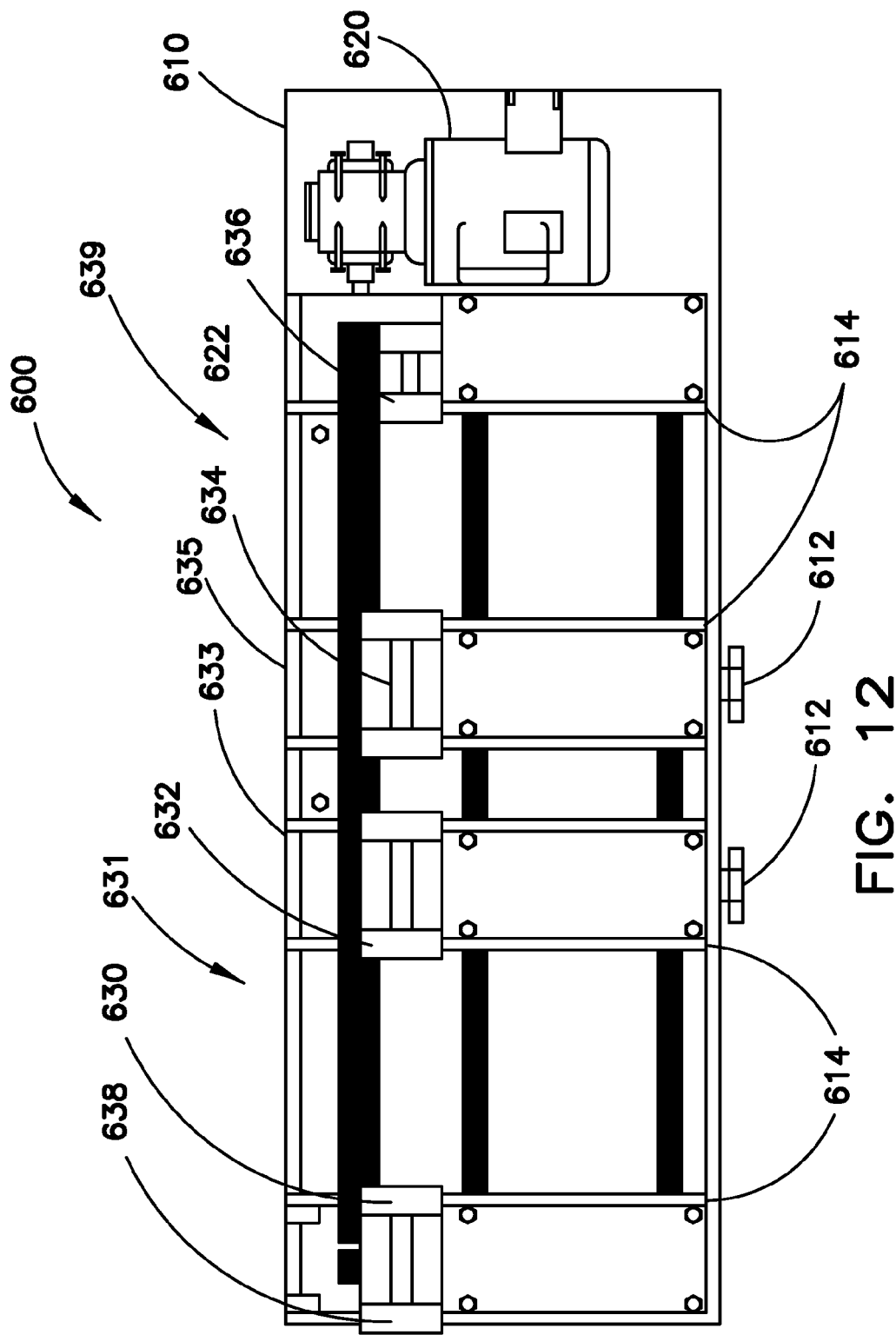
FIG. 12 shows a plan view of a cold seal compressor for an adhesive application method according to the present disclosure.

FIG. 11 shows a cold seal compressor 600 according to the present disclosure for use with the cold seal compressor method 900 to meet the specific sealing requirements of the adhesive 40. As shown in FIGS. 11 and 12, the cold seal compressor 600 includes a bed 610 upon which are mounted a plurality of sealing roller pairs 630, 632, 634, 636, 638 that are mechanically connected to a drive spline 622 that is further mechanically coupled to a drive motor 620, whereby the drive motor 620 powers rotation of the drive spline 622. As shown in FIGS. 11 and 12, the cold seal compressor 600 may include a first sealing roller pair 630, a second sealing roller pair 632, a third sealing roller pair 634, and a fourth sealing roller pair 636. Optionally, the cold seal compressor 600 may include a side sealing roller pair 638 capable of sealing one edge of the housing 20 with each pass. Each sealing roller pair is capable of applying a sealing pressure between 10,000 and 40,000 psi.

Figure 13:
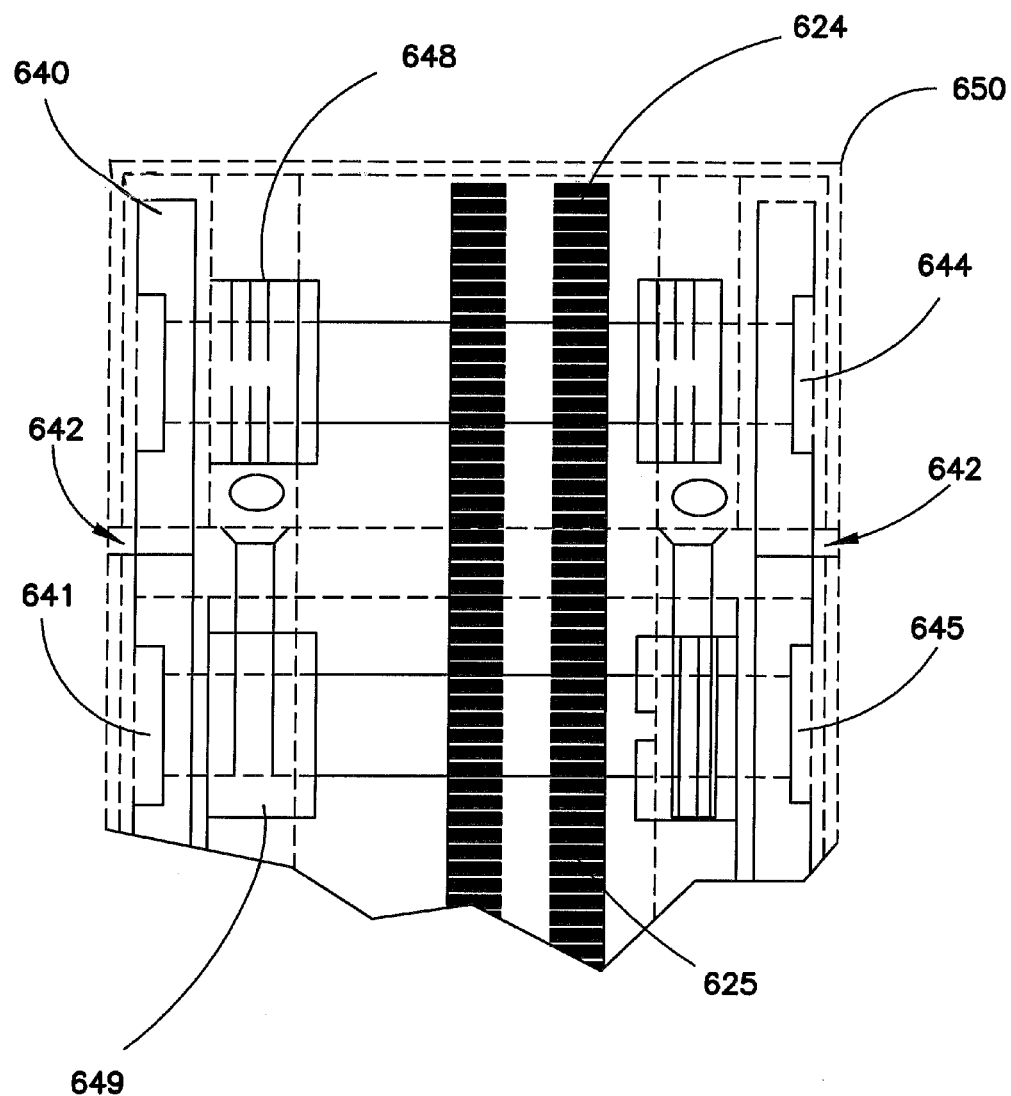
FIG. 13 shows a detail view of a cold seal compressor for an adhesive application method according to the present disclosure.

As shown in FIG. 13, each sealing roller pair may include an upper sealing roller 640 and an opposing lower sealing roller 641. Each upper sealing roller 640 may be rotatably mounted on an upper roller shaft 644 that is supported by an upper bearing 648 disposed adjacent the upper sealing roller 640. The upper roller shaft 644 is driven by an upper gear 624 disposed on the upper roller shaft 644 adjacent the upper bearing 648. Each lower sealing roller 641 may be disposed adjacent the upper sealing roller 640 and may be rotatably mounted on a lower roller shaft 645 that is supported by a lower bearing 649 disposed adjacent the lower sealing roller 641, whereby the lower roller shaft 645 is driven by a lower gear 625 disposed adjacent the lower bearing 649 on the lower roller shaft 645. The upper sealing roller 640 and the lower sealing roller 641 contact each other at a pinch point 462. Each upper gear 624 is mechanically coupled to each corresponding lower gear 625, which is in turn mechanically coupled to the drive spline 622. Alternatively, each of the upper and lower gears 624, 625 may include additional gears disposed adjacent one another to improve torque conversion and minimize slippage between the upper and lower gears 624, 625 and the drive spline 622. In addition, as shown in FIG. 11, each sealing roller pair may be covered by a guard 650 to prevent an operator from inserting a finger, clothing, or other item between the rotating sealing rollers or gears, thereby preventing personal injury.

In operation, when the housing 20 in the folded configuration is fed between the upper sealing roller 640 and the lower sealing roller 641, each sealing roller pair is capable of applying sufficient pressure to the housing 20 to activate the adhesive 40 applied to the interior surface 25 and permanently seal the top and bottom portions 27, 29 of the housing 20 to one another. For example, each sealing roller pair may produce between 10,000 and 40,000 psi of sealing pressure at a pinch point 642 where the upper sealing roller 640 and the lower sealing roller 641 contact one another. The sealing force produced by each sealing roller pair may be adjustable to accommodate process variations, including the thickness of the housing 20, the thickness of the adhesive 40, ambient environmental conditions that affect the pressure sensitivity of the adhesive 40 such as temperature and humidity, and other applicable process parameters.

The cold seal compressor 600 provides a number of advantages over conventional packaging sealing machines. For example, the use of separate upper and lower roller shafts 644, 645 for each sealing roller pair 630, 632, 634, 636, 638 and of a remote drive spline 622 enables sealing of large containers 10 with product volumes 38 that project a significant depth from the plane of the housing 20, unlike conventional sealing machines that are limited by the radial dimension of the sealing rollers 640, 641. Moreover, the use of separate upper and lower roller shafts 644, 645 and corresponding bearings 648, 649 disposed in close proximity to each sealing roller 640, 641 enables each sealing roller pair 630, 632, 634, 636, 638 to apply the same amount of sealing force to the housing 20, unlike conventional sealing machines where the use of a common shaft for all rollers allows the common shaft to deflect over the distance between sealing roller pairs, thereby reducing to seal force applied.

The cold seal compressor 600 may be capable of sealing at least two edges of the housing 20 in one pass. As shown in FIG. 11, the first and second sealing roller pair 630, 632 may be positioned on the same plane and separated by a distance less than the width between the first and second side edges 26, 28 of the housing 20. Likewise, the third and fourth sealing roller pair 634, 636 may be positioned on a plane and separated by a distance less than the width between the leading and trailing edges 22, 24 of the housing 20. The first and second sealing roller pair 630, 632 define a first sealing roller set 631, and the third and fourth sealing roller pair 634, 636 define a second sealing roller set 639. To facilitate alignment of the housing 20 as it is fed into each of the first and second sealing roller sets 631, 639, one or more housing guides 614 may be mounted on the bed 610 on the same plane as the pinch point 642.

In at least one embodiment of the present disclosure, the distance between each set of roller pairs (i.e., first and second 630, 632; and third and fourth 634, 636) may be adjustable. As shown in FIG. 11, the second sealing roller pair 632 and associated housing guide 614 may be mounted to a first sliding table 633, which is slidably mounted to the bed 610. Similarly, the third sealing roller pair 634 and associated housing guide 614 may be mounted to a second sliding table 635, which is slidably mounted to the bed 610. Each of the sliding tables 633, 635 are capable of movement along the drive spline 622, whereby the lower gears 625 associated with each sealing roller pair 623, 634 maintain the mechanical coupling with the drive spline 622 and also remaining in alignment with the first and fourth sealing roller pair 630, 638, respectively. Further, the sliding tables 633, 635 may be held in a desired location along the drive spline 622 by one or more table locks 612. Accordingly, the sliding tables 633, 635 enable variable positioning of the second and third sealing roller pair 632, 634, which in turn enables the cold seal compressor 600 to seal housings 20 of varying widths with a quick and easy adjustment of the location of the sliding tables 633, 635.

Figure 14:
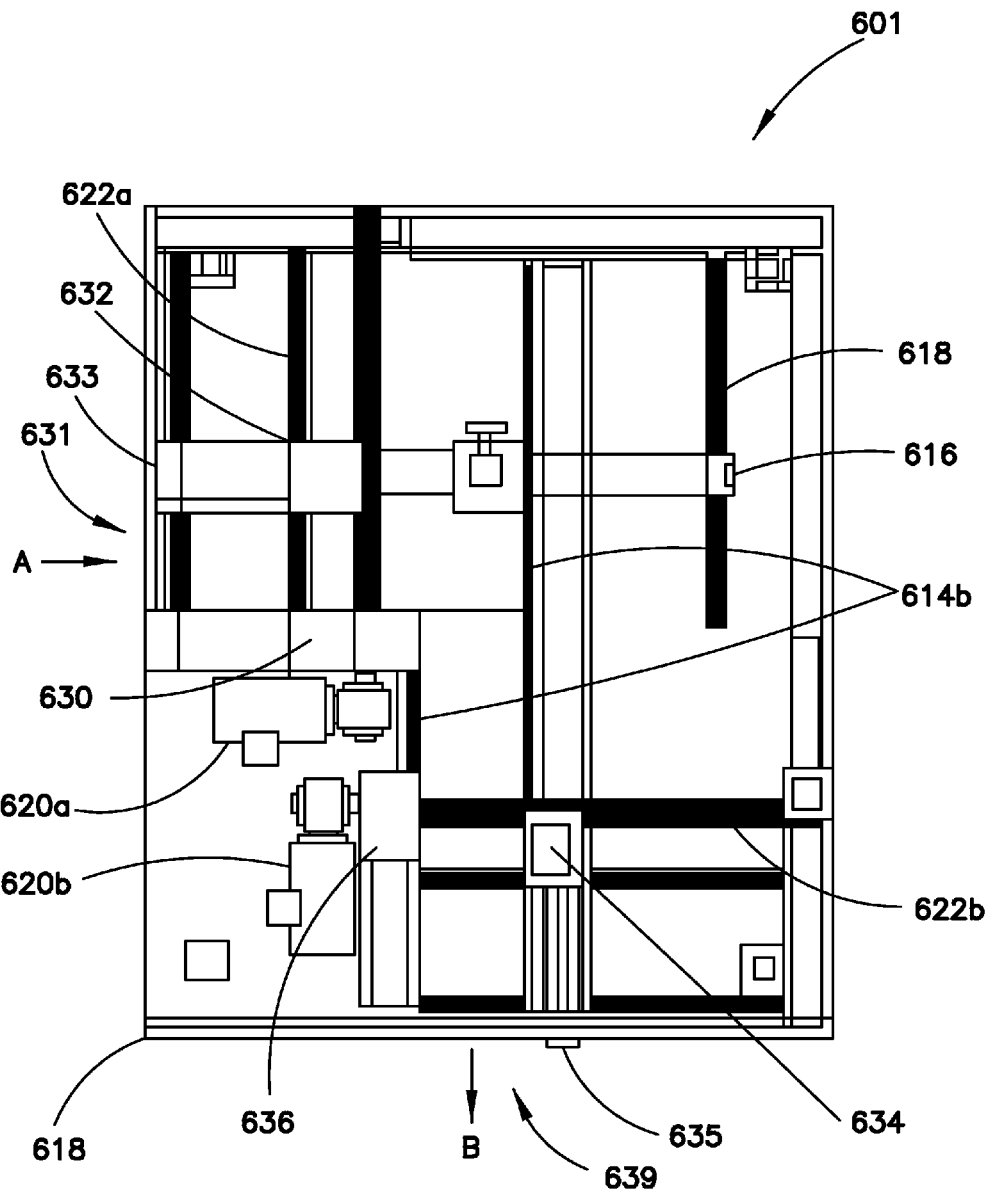
FIG. 14 shows a plan view of a cold seal compressor for an adhesive application method according to the present disclosure.

In an operation to seal a housing 20 using the cold seal compressor 600, the housing 20 may be fed through the first sealing roller set 631 by any appropriate means and then manually rotated and fed by an operator into the second sealing roller set 639. Alternatively, the housing 20 may be sealed using a cold seal compressor 601, as shown in FIG. 14. The cold seal compressor 601 is substantially similar to the cold seal compressor 600 but differs in the orientation of the second sealing roller set 639 and in the means of transport of the housing 20 from the first sealing roller set 631 to the second sealing roller set 639. As shown in FIG. 14, the cold seal compressor 601 may include a first sealing roller set 631 and a second sealing roller set 639 mounted on the same plane to a bed 618 and oriented at a right angle to one another. Consequently, the first sealing roller set 631 may include a drive motor 620a mechanically coupled a drive spline 622a as described herein relative to the cold seal compressor 600. Likewise, the second sealing roller set 639 may include a separate drive motor 620b mechanically coupled a drive spline 622b as described herein relative to the cold seal compressor 600.

The cold seal compressor 601 may further include a transfer arm 616 slidably mounted to a transfer guide 618 disposed between the first and second sealing roller sets 631, 639. The transfer arm 616 conveys and feeds the housing 20 into the second roller set 639 after the housing 20 passes through the first roller set 631. In operation, as shown in FIG. 14, the housing 20 may be fed by any appropriate means into the first roller set 631 in the direction of arrow A. Upon exiting the first roller set 631, the housing 20 may come to rest adjacent housing guide 614b. The transfer arm 616 may then advance in the direction of arrow B along the transfer guide 618, thereby conveying and feeding the housing 20 into the second roller set 639, which is capable of sealing the remaining unsealed edges of the housing 20. Consequently, the cold seal compressor 601 is capable of sealing the housing 20 with less manual handling by an operator.

Figure 15:
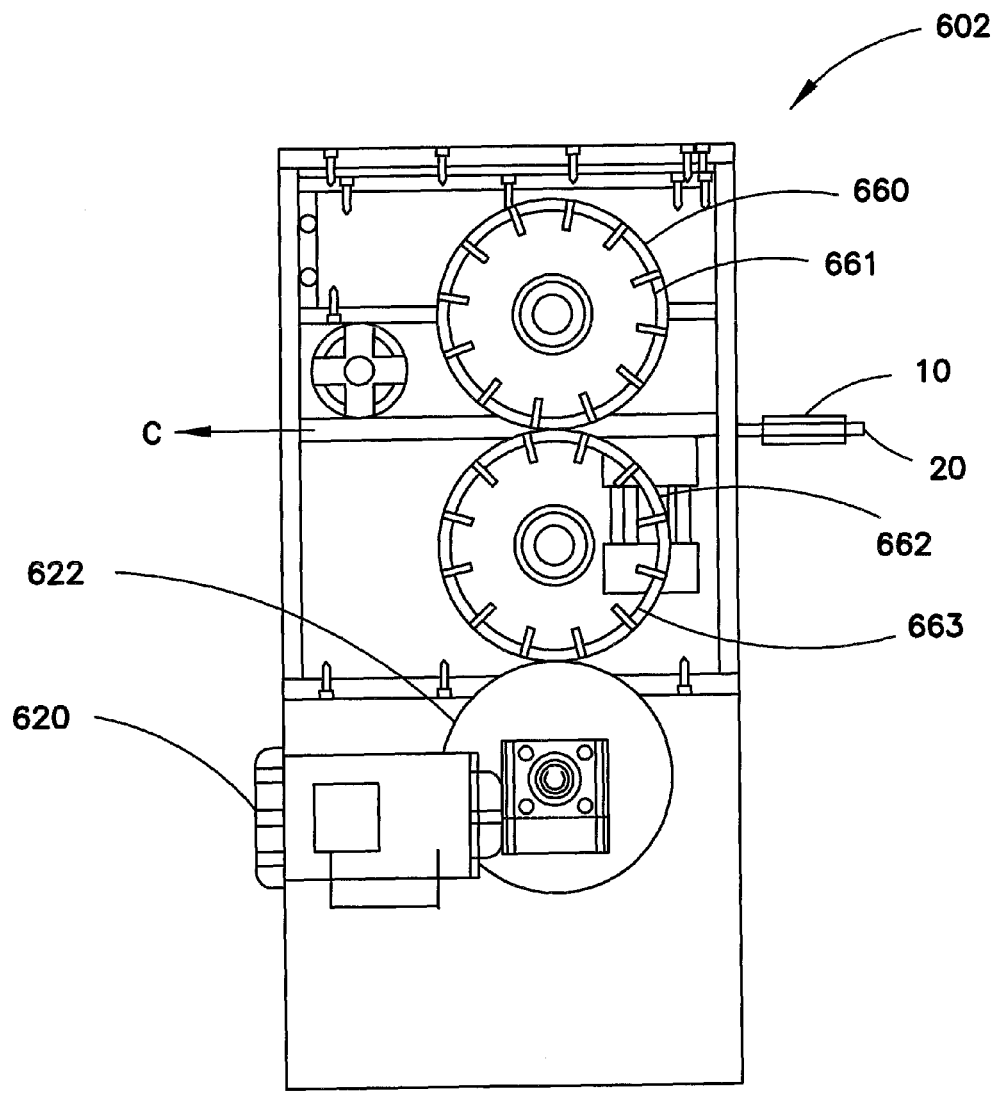
FIG. 15 shows a side view of a cold seal compressor for an adhesive application method according to the present disclosure.
Figure 16:
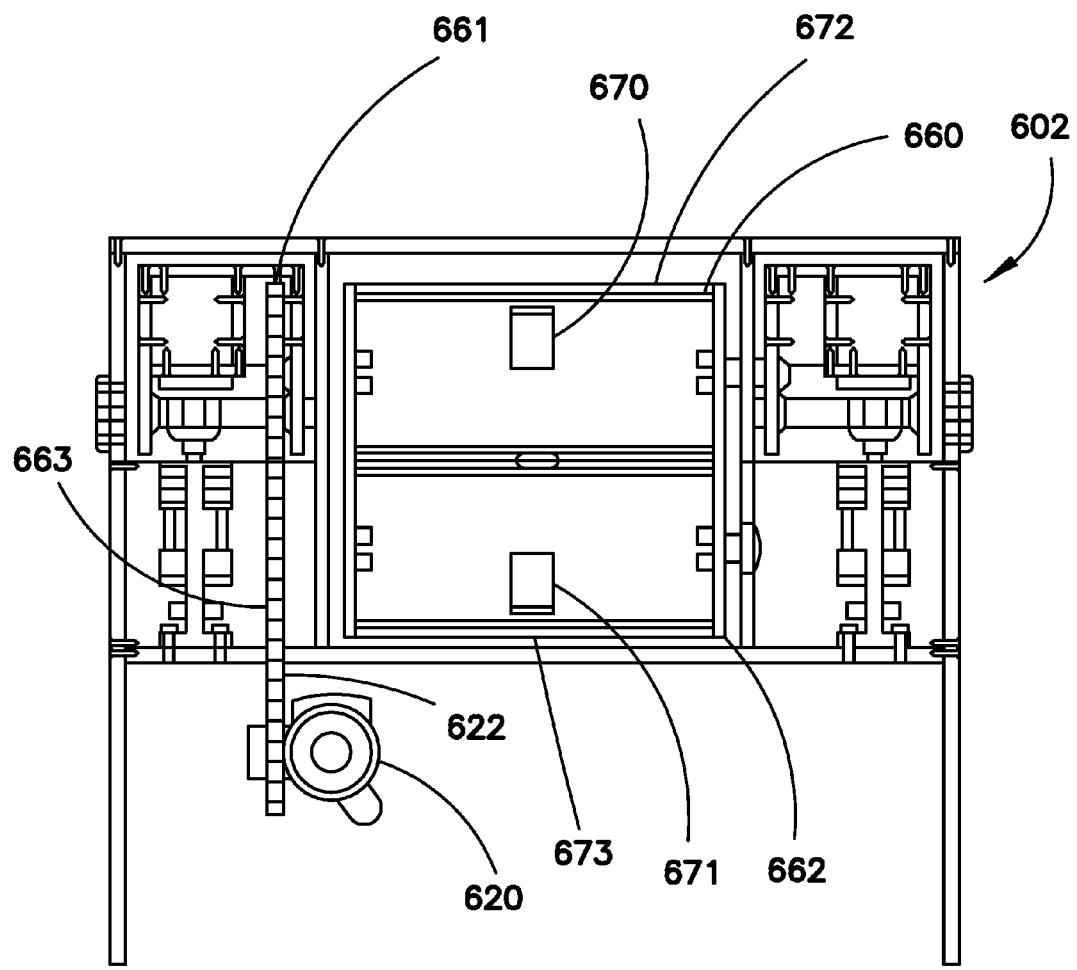
FIG. 16 shows a front view of a cold seal compressor for an adhesive application method according to the present disclosure.

FIGS. 15 and 16 show an alternative cold seal compressor 602 of the present disclosure. The cold seal compressor 602 includes an upper sealing drum 660 in contact with a lower sealing drum 661, both capable of rotation about their respective axes. The cold seal compressor 602 may further include a upper drum gear 661 disposed adjacent the upper sealing drum 660 and a lower drum gear 663 disposed adjacent the lower sealing drum 662, whereby the upper and lower drum gears 661, 663 are mechanically coupled to one another. The cold seal compressor 602 may further include a drive motor 620 mechanically coupled to a drum drive gear 622, which in turn is mechanically coupled to the upper and lower drum gears 661, 663.

As shown in FIG. 16, the upper sealing drum 660 may include an upper drum opening 670 through an outer shell 672 sized to accept the product volume portion 38 of a container 10. Likewise, the lower sealing drum 661 may include a lower drum opening 671 through an outer shell 673 sized to accept the product volume portion 38 of a container 10. The cold seal compressor 602 is capable of sealing a housing 20 by applying suffice compressive force to exterior surface 23 to activate the cohesive properties of adhesive 40. Unlike the sealing rollers of the cold seal compressor 600 and cold seal compressor 601, which are intended to apply significant sealing force across the relatively narrow perimeter area of the housing 20, the upper and lower sealing drums 660, 662 of the cold seal compressor 602 are capable of applying significant sealing force across the entire exterior surface 23 of the housing 20. For example, where the housing 20 includes both perimeter adhesive regions 42, 43 and product adhesive regions 44, 45 as shown in FIG. 3, the upper and lower drum openings 670, 671 may substantially mimic the flange perimeter 35 of the tray 30, thereby applying sealing pressure to all adhesive regions 42, 43, 44, and 45.

Alternatively, the upper and lower drum openings 670, 671 may include a relief pattern capable of contacting predetermined areas across the exterior surface 23. For example, where the housing 20 includes both perimeter adhesive regions 42, 43 and product adhesive regions 44, 45 as shown in FIG. 3, the upper and lower drum openings 670, 671 may include areas between the regions 42, 43, 44, 45 that do not contact the exterior surface 25 because sealing force is not required in those areas without applied adhesive 40.

While various embodiments of product packing container and adhesive application method for making the same have been described in considerable detail herein, the embodiments are merely offered by way of non-limiting examples of the disclosure described herein. It will therefore be understood that various changes and modifications may be made, and equivalents may be substituted for elements thereof, without departing from the scope of the disclosure and are intended to encompass any later appended claims. Indeed, this disclosure is not intended to be exhaustive or to limit the scope of the disclosure.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. Other sequences of steps may be possible. Therefore, the particular order of the steps disclosed herein should not be construed as limitations of the present disclosure. In addition, disclosure directed to a method and/or process should not be limited to the performance of their steps in the order written. Such sequences may be varied and still remain within the scope of the present disclosure.

We claim:

1. A method for applying a cold seal adhesive, the method comprising the steps of:
   delivering a cold seal adhesive to a volume within a chambered doctor blade disposed adjacent a rotating transfer roller having a transfer surface;
   transferring a quantity of adhesive is to the transfer surface from the volume of the chambered doctor blade;
   rotating the transfer roller whereby the transfer surface contacts a printing die mounted to a rotating die roller disposed adjacent the transfer roller, whereby at least a first portion of the quantity of adhesive is transferred from the transfer surface to the printing die;
   feeding a housing between the die roller and an adjacent rotating impression roller, wherein the housing comprises an interior surface, an opposing exterior surface, a top portion, a bottom portion, and at least one adhesive region on the interior surface, and wherein the impression roller is capable of supporting the exterior surface of the housing, whereby simultaneous rotation of the die roller and the impression roller advances the housing therebetween;

rotating the die roller whereby the printing die contacts the at least one adhesive region on the interior surface of the housing and transfers a second portion of the quantity of adhesive from the printing die to the at least one adhesive region forming a fifth as the housing advances between the die roller and the impression roller, the film having a thickness between 0.0015-0.007 inches; and drying the adhesive on the housing, wherein the adhesive is a cold seal, latex-based adhesive, with a viscosity of no more than 450 centipoise, which adheres to the housing when applied in a liquid form but is capable of drying such that the dried adhesive lacks tackiness and is cohesive only to itself when compressed with a pressure of at least 10,000 pounds per square inch.

2. The method of claim 1, wherein the transfer roller further comprises a plurality of cells engraved into the transfer surface of the transfer roller, the cells being capable of accepting the quantity of the adhesive from the volume, wherein the cells contact the printing die mounted to the rotating die roller disposed adjacent the transfer roller, whereby the adhesive is transferred from the cells to the printing die.

3. The method of claim 1, wherein the housing is capable of a folded configuration whereby the interior surface of the top portion at least partially contacts the interior surface of the bottom portion.

4. The method of claim 3, further comprising the steps of:
folding the housing having a cold seal adhesive applied thereon into the folded configuration; and
applying at least 10,000 pounds per square inch of pressure to the exterior surface of the housing opposite the adhesive region when the housing is in the folded configuration.

5. The method of claim 1, wherein the adhesive is delivered to the doctor blade using a peristaltic pump.

6. The method of claim 1, wherein the adhesive is dried on the housing using one or more dryers and is advanced to the one or more dryers by a plurality of feed rollers.

7. The method of claim 6, wherein the one or more dryers is selected from a group consisting of radio-wave dryers, macro-wave dryers, and infrared dryers.

* * * * *